US008300141B2

(12) United States Patent
Ohnishi et al.

(10) Patent No.: US 8,300,141 B2
(45) Date of Patent: Oct. 30, 2012

(54) PORTABLE TERMINAL APPARATUS, IMAGE OUTPUT APPARATUS, METHOD OF CONTROLLING PORTABLE TERMINAL APPARATUS, AND RECORDING MEDIUM

(75) Inventors: Hideki Ohnishi, Osaka (JP); Makoto Hayasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 12/882,881

(22) Filed: Sep. 15, 2010

(65) Prior Publication Data

US 2011/0063456 A1 Mar. 17, 2011

(30) Foreign Application Priority Data

Sep. 17, 2009 (JP) ................................. 2009-215702

(51) Int. Cl.
*H04N 5/238* (2006.01)
(52) U.S. Cl. ..................................... 348/364; 348/207.2
(58) Field of Classification Search .... 348/221.1–229.1, 348/208.13
See application file for complete search history.

(56) References Cited

U.S. PATENT DOCUMENTS

| | | | | |
|---|---|---|---|---|
| 7,605,849 | B1 * | 10/2009 | Hatanaka | 348/231.2 |
| 7,782,384 | B2 * | 8/2010 | Kelly | 348/333.01 |
| 8,145,008 | B2 * | 3/2012 | Chen et al. | 382/275 |
| 2004/0215059 | A1 | 10/2004 | Homan et al. | |
| 2005/0012848 | A1 | 1/2005 | Hayaishi | |
| 2007/0188613 | A1 * | 8/2007 | Nobori et al. | 348/207.1 |
| 2009/0040364 | A1 * | 2/2009 | Rubner | 348/362 |
| 2009/0059025 | A1 | 3/2009 | Tsujino et al. | |
| 2009/0251591 | A1 * | 10/2009 | Whitham | 348/362 |
| 2010/0265330 | A1 * | 10/2010 | Li et al. | 348/148 |

FOREIGN PATENT DOCUMENTS

| | | |
|---|---|---|
| JP | 2002-41502 A | 2/2002 |
| JP | 2002-232708 A | 8/2002 |
| JP | 2004-321605 A | 11/2004 |

(Continued)

OTHER PUBLICATIONS

Saito, "Super-Resolution Oversampling from a Single Image", ITE Journal, 2008, vol. 62, No. 2, pp. 181-189.
Tanaka et al., "Super-resolution: High-resolution Image Reconstruction from Multiple Low-resolution Images", ITE Journal, 2008, vol. 62, No. 3, pp. 337-342.

(Continued)

*Primary Examiner* — Chieh M Fan
*Assistant Examiner* — Wesley J Chiu
(74) *Attorney, Agent, or Firm* — Birch, Stewart, Kolasch & Birch, LLP

(57) ABSTRACT

The invention accomplishes an image capture apparatus capable of allowing a user to more easily attain, as compared to a conventional image capture apparatus, image data of a captured image which includes no blown-out highlights or loss of shadow detail throughout an entire image. A portable terminal apparatus 100 includes (i) an image capture section 120 capable of consecutively carrying out image capture of a same image capture object a plurality of times; and (ii) a captured image determination section 130 for determining whether or not blown-out highlights or loss of shadow detail is included in an image indicated by captured image data obtained by the image capture, and in a case where the captured image determination section 130 determines that the blown-out highlights or loss of shadow detail is included in the image, the image capture section 120 consecutively carries out image capture of the image capture object under a plurality of exposure conditions different from the exposure condition in the image capture carried out to obtain the captured image data, and the communication section 150 transmits obtained captured image data to the image output apparatus 500.

9 Claims, 17 Drawing Sheets

FOREIGN PATENT DOCUMENTS

| | | |
|---|---|---|
| JP | 2005-33514 A | 2/2005 |
| JP | 2005-217898 A | 8/2005 |
| JP | 2006-237757 A | 9/2006 |
| JP | 2007-143054 A | 6/2007 |
| JP | 2007-336011 A | 12/2007 |
| JP | 2008-104009 A | 5/2008 |
| JP | 2009-53428 A | 3/2009 |

OTHER PUBLICATIONS

Tomasi et al., "Bilateral Filtering for Gray and Color Images", Proceedings of the 1998 IEEE International Conference on Computer Vision, Bombay, India (8 pages).

* cited by examiner

FIG. 6

| tan Θ | Θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| : | : |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

| 0 | -1 | 0 |
|---|----|---|
| -1 | 4 | -1 |
| 0 | -1 | 0 |

- BOUND BOX

FRAME OF CORRECTED
IMAGE MAINTAINING
ASPECT RATIO

| MN | 0 |
|---|---|
| MN+△ | 1 |
| MN+△×2 | 2 |
| MN+△×3 | 3 |
| MN+△×4 | 4 |
| ⋮ | ⋮ |
| ⋮ | ⋮ |
| MN+△×255 | 255 |

PORTABLE TERMINAL APPARATUS, IMAGE OUTPUT APPARATUS, METHOD OF CONTROLLING PORTABLE TERMINAL APPARATUS, AND RECORDING MEDIUM

This Nonprovisional application claims priority under 35 U.S.C. §119(a) on Patent Application No. 2009-215702 filed in Japan on Sep. 17, 2009, the entire contents of which are hereby incorporated by reference.

TECHNICAL FIELD

The present invention relates to a portable terminal apparatus, an image output apparatus, a method of controlling a portable terminal apparatus, an image output method, a program, and a computer-readable recording medium, each of which automatically adjusts an image capture condition in carrying out image capture.

BACKGROUND ART

With the development of Internet technology and the increase in functions provided to mobile equipment, chances are increasing to capture images by use of a portable terminal apparatus such as a mobile phone. Not only landscapes and people, but also panels displayed in various shows, which panels have explanation diagrams and descriptions displayed thereon, and furthermore slides displayed in an academic conference or the like are now being more regarded as a subject for image capture.

The panels displayed in various shows, which panels have explanation diagrams and descriptions displayed thereon, are at times exposed to light such as a spotlight, to make the panels more easily visible for the attendance. In a case where the subject is exposed to light, a person who is to capture an image usually determines its luminance as not particularly dark or bright and that image capture can be carried out without any problems. However, there are cases where in an image captured by a normal camera including a digital camera disclosed in Patent Literature 1, luminance in a part of the image which is locally exposed to the light of the spotlight or the like is much brighter than that in a part where the image is not exposed to the light.

In such a case, if an exposure condition (gain, aperture etc.) is adjusted so that visibility of a dark part is improved, a bright part often is overexposed. On the other hand, if the exposure condition is adjusted so that visibility of the bright part is improved, the dark part often loses shadow detail. Accordingly, unless the camera is highly functioned and a user of the camera has sufficient knowledge, it is difficult to capture an image so that the piece of captured image has good visibility and readability throughout its entire region.

Various studies have been performed to improve quality of captured images; one example of this is an image capture apparatus disclosed in Patent Literature 2. This image capture apparatus extracts location information of a subject by comparing (i) still image data obtained by carrying out image capture with use of no test flash and (ii) still image data obtained by carrying out image capture with use of a test flash. This comparison allows emitting an appropriate amount of light from the flash to a region indicated by the location information, so as to obtain a finalized captured image.

CITATION LIST

Patent Literature

Patent Literature 1
Japanese Patent Application Publication, Tokukai, No. 2002-41502 A (Publication Date: Feb. 8, 2002)
Patent Literature 2
Japanese Patent Application Publication, Tokukai, No. 2007-336011 A (Publication Date: Dec. 27, 2007)

SUMMARY OF INVENTION

Technical Problem

However, even with the foregoing conventional arrangement, there is a high chance that one of either blown-out highlight or loss of shadow detail occurs in the captured image in a case where image capture is carried out to a subject partially exposed to light of a spotlight or the like. Hence, the problem that it is difficult to ensure good visibility throughout the entire captured image still has not been solved.

The present invention is accomplished in view of the foregoing problem, and its main object is to fabricate a portable terminal apparatus which allows a user to more easily obtain, compared to a conventional technique, image data of a captured image including no blown-out highlights or loss of shadow detail throughout its entire image.

Solution to Problem

In order to attain the object, a portable terminal apparatus including a transmission section for transmitting a plurality of pieces of image data to an image output apparatus that outputs image data is a portable terminal apparatus including: an image capture section capable of consecutively carrying out image capture a plurality of times with respect to a same image capture object; and a captured image determination section for determining whether or not captured image data meets a given condition, the captured image data being obtained by carrying out the image capture by the image capture section, in a case where the captured image determination section determines that the captured image data meets the given condition, the image capture section consecutively carrying out image capture with respect to the image capture object under a plurality of different exposure conditions from an exposure condition set for carrying out the image capture for obtaining said captured image data, and the transmission section transmitting, to the image output apparatus, captured image data obtained by carrying out the image capture with respect to the image capture object under the plurality of different exposure conditions. Here, the given condition includes at least the following condition A:

Condition A: a captured image indicated by the captured image data, (a) including a first region and a second region, the first region being a region of a white pixel group consisting of white pixels having features indicative of luminance being not less than a first threshold, and the second region being a region surrounding the first region in a given range, the second region including white pixels that have the features being not less than a second threshold, the second threshold being smaller than the first threshold, or alternatively, (b) including a third region and a fourth region, the third region being a region of a black pixel group consisting of black pixels having the features being not more than a third threshold, and the fourth region being a region surrounding the third region in a given range, the fourth region including black pixels that have the features being not more than a fourth threshold, the fourth threshold being greater than the third threshold.

According to the arrangement, a portable terminal apparatus carries out image capture with respect to a same image capture object under a plurality of different exposure conditions, in a case where, in a captured image, a white pixel group region includes white pixels having a pixel value of not less than a first threshold, and a region in a given range surrounding the white pixel group region includes white pixels having a pixel value of not less than a second threshold, which second threshold is smaller than the first threshold. Alternatively, the portable terminal apparatus carries out image capture with respect to a same image capture object under a plurality of different exposure conditions in a case where, in the captured image, a black pixel group region includes black pixels having a pixel value of not more than a third threshold, and a region of a given range that surrounds a black pixel group region includes black pixels having a pixel value of not more than a fourth threshold, which fourth threshold is greater than the third threshold. For example, the portable terminal apparatus carries out image capture under a plurality of different exposure conditions with respect to a same image capture object, in a case where the captured image includes, in a region within a total of 5 dots (pixels) vertically and horizontally from a boundary of a white pixel group region, pixels having pixel values within a range of not less than 240 to less than 250, where the white pixel group region is constituted of white pixels having pixel values of not less than 250.

Namely, in a case where a captured image possibly includes blown-out highlights or loss of shadow detail, image capture is carried out to a same image capture object under a plurality of different exposure conditions.

Here, it is clear that if image capture is carried out under a plurality of different exposure conditions, a possibility that a captured image not including any blown-out highlights or loss of shadow detail throughout an image is included in the obtained plurality of captured images increases, regardless of good or poor of image capturing technique of the user.

Therefore, the portable terminal apparatus makes it possible for the user to obtain image data of a captured image including no blown-out highlights or loss of shadow detail throughout the image, more easily than a conventional technique.

In order to attain the object, a control method of the present invention is a method of controlling a portable terminal apparatus including (i) a transmission section for transmitting a plurality of pieces of image data to an image output apparatus that outputs image data and (ii) an image capture section capable of consecutively carrying out image capture a plurality of times with respect to a same image capture object, the method including the steps of: a captured image determination section determining whether or not captured image data obtained by carrying out image capture by the image capture section meets a given condition; in a case where the captured image determination section determines that said captured image data meets the given condition, the image capture section consecutively carrying out image capture of the image capture object under a plurality of exposure conditions different from an exposure condition set for carrying out the image capture for obtaining the captured image data; and the transmission section transmitting, to the image output apparatus, captured image data obtained by carrying out the image capture with respect to the image capture object under the plurality of different exposure conditions. Here, the given condition includes at least the following condition A:

Condition A: a captured image indicated by the captured image data, (a) including a first region and a second region, the first region being a region of a white pixel group consisting of white pixels having features indicative of luminance being not less than a first threshold, and the second region being a region surrounding the first region in a given range, the second region including white pixels that have the features being not less than a second threshold, the second threshold being smaller than the first threshold, or alternatively, (b) including a third region and a fourth region, the third region being a region of a black pixel group consisting of black pixels having the features being not more than a third threshold, and the fourth region being a region surrounding the third region in a given range, the fourth region including black pixels that have the features being not more than a fourth threshold, the fourth threshold being greater than the third threshold.

With this arrangement, an effect similar to that attained by the portable terminal apparatus of the present invention is attained.

For a fuller understanding of the nature and advantages of the invention, reference should be made to the ensuing detailed description taken in conjunction with the accompanying drawings.

Effect of Invention

A portable terminal apparatus of the present invention allows a user to more easily obtain image data of a captured image that includes no blown-out highlights or loss of shadow detail throughout an image.

BRIEF DESCRIPTION OF DRAWINGS

FIG. 6 shows angles θ of a skew and their respective tangents which angles and tangents are obtained in the example of detection of the skew which example is illustrated in FIG. 5.

FIG. 18(a) is a view illustrating a method for calculating pixel values of interpolated pixels in a case where an edge direction is an upper left-lower right direction.

FIG. 18(b) is a view illustrating a method for calculating the pixel values of the interpolated pixels in a case where the edge direction is a left-right direction.

FIG. 18(c) is a view illustrating a method for calculating the pixel values of the interpolated pixels in a case where the edge direction is an upper right-lower left direction.

FIG. 18(d) is a view illustrating a method for calculating the pixel values of the interpolated pixels in a case where the edge direction is an upper-lower direction.

In FIG. 21, (a) and (b) illustrate the captured images, and (c) through (h) illustrate the binary images.

DESCRIPTION OF EMBODIMENTS

Figure 1:
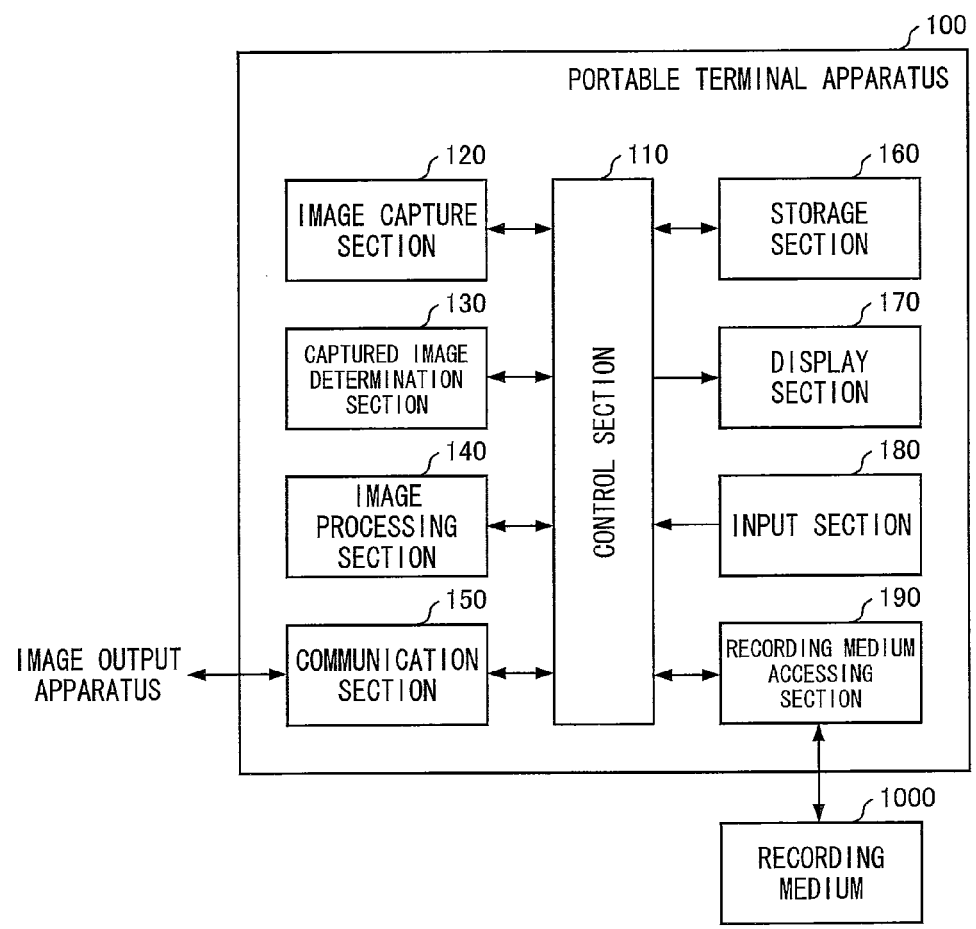
FIG. 1 is a block diagram illustrating an arrangement of a portable terminal apparatus included in a captured image processing system of the present invention.
Figure 2:
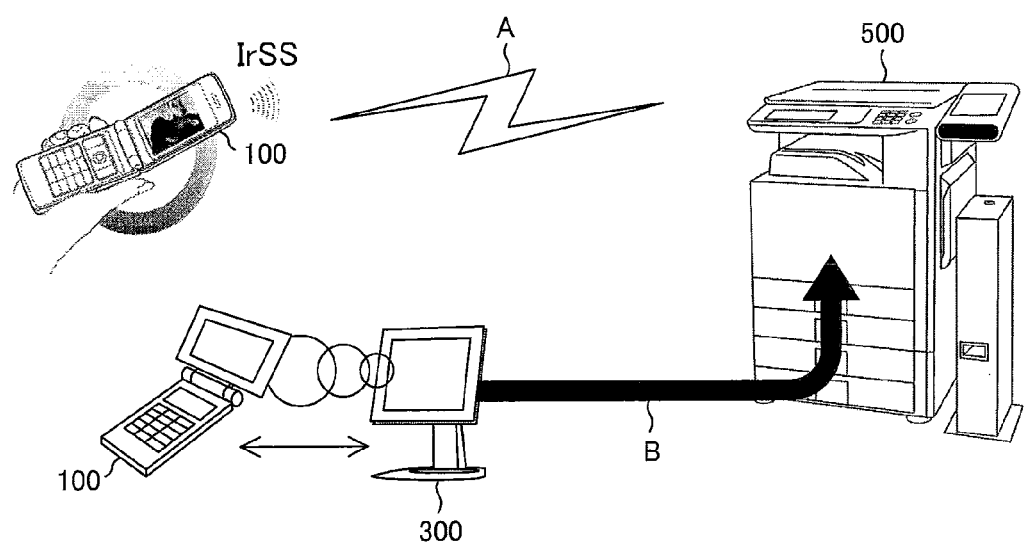
FIG. 2 is a view illustrating an entire arrangement of a captured image processing system in accordance with one embodiment of the present invention.

(1) Overall Arrangement of Captured Image Processing System

A captured image processing system in accordance with one embodiment of the present invention includes (i) a portable terminal apparatus 100 including image capture means, such as a camera-equipped mobile phone or a digital still camera and (ii) an image output apparatus (MFP) 500 such as a multifunction printer or a printer (image forming apparatus).

The portable terminal apparatus 100 is carried with a user. The user can cause the portable terminal apparatus 100 to carry out image capture (hereinafter, "image capture" denotes making image data available to a user, such as storing image data in a recording medium or sending the image data outside via a communication section, which image data is image data which includes an object captured as a subject) with respect to an object in various scenes. Images taken in by the portable terminal apparatus 100 are subjected to image determination processing, which processing determines whether or not the image is an acceptable image including no blown-out highlights or loss of shadow detail. Furthermore, if the image is determined as not acceptable, the portable terminal apparatus 100 carries out image capture of the image capture object a plurality of times, under respective different exposure conditions.

The portable terminal apparatus 100, which is communicable with the image output apparatus 500, transmits, to the image output apparatus 500, image data (hereinafter referred to as captured image data) of each of captured images obtained by the image capture carried out a plurality of times.

The image output apparatus 500 carries out high resolution correction to each of captured image data received from the portable terminal apparatus 100, to improve its resolution. Thereafter, the image output apparatus selects image data that includes few overexposure or underexposure regions, from a plurality of pieces of image data prepared as a result of the high resolution correction.

In the present embodiment, the portable terminal apparatus 100 has a function of a text image capture mode which is a function that can obtain from the image output apparatus 500 image data that has a higher resolution than that of image data obtained by the image capture. Moreover, the portable terminal apparatus 100 has a mode (plurality piece image capture mode) that allows carrying out image capture of a plurality of pieces (around two (2) to fifteen (15) pieces; depending on image resolution) of images upon clicking a shutter button (not illustrated) once. The plurality piece image capture mode is automatically enabled upon selection of the text image capture mode.

In the present embodiment, in a case where a user carries out image capture of an image capture object having a rectangular shape such as a document or a slide, and the user wishes to obtain an image having a resolution higher than that of the captured image, the user selects the text image capture mode.

Note also that it is not always possible for the user to carry out image capture from the front with respect to the image capture object which has a rectangular shape, such as a document, a panel, or a slide. Namely, the user may obliquely carry out image capture with respect to the image capture object, in a state where (i) a normal direction of a plane of the image capture object on which plane the text image is formed and (ii) a direction in which image capture means carries out the image capture do not coincide with each other. In this case, the image capture object undergoes a distortion (hereinafter referred to as a geometric distortion) in the captured image. The present embodiment is arranged to cause the image output apparatus 500 to output an image, in which such a geometric distortion has been corrected, in a case where the text image capture mode is selected.

Output processes that are carried out by the image output apparatus 500 encompass: a printing process of an image based on a high resolution captured image data; a filing process for storing the high resolution captured image data to a server or a storage device (e.g. USB memory); and an e-mail transmission process for transmitting an e-mail to which high resolution captured image data is attached.

Note that an example of a system used for communication between the portable terminal apparatus 100 and the image output apparatus 500 includes a system in which the captured image data is once transmitted from the portable terminal apparatus 100 to a relay apparatus 300 through a wireless communication based on any one of infrared communication standards such as IrSimple or through a non-contact wireless communication such as Felica (registered trademark); thereafter, the captured image data is forwarded to the image output apparatus 500 from the relay apparatus 300 by use of a wireless communication such as Bluetooth (registered trademark). Note that not only the foregoing communication systems but also a system employing a publicly-known method is applicable to the communication between the portable terminal apparatus 100 and the image output apparatus 500.

(2) Arrangement of Portable Terminal Apparatus

First, the portable terminal apparatus 100 of the present embodiment is described below with reference to FIGS. 1 to 10, and 21.

FIG. 1 is a block diagram illustrating an arrangement of the portable terminal apparatus 100. As illustrated in FIG. 1, the portable terminal apparatus 100 includes a control section 110, an image capture section 120, a captured image determination section 130, an image processing section 140, a communication section 150, a storage section 160, a display section 170, an input section 180, and a recording medium accessing section 190.

The image capture section 120 takes in an image of an image capture object by use of a CCD/CMOS sensor. The image capture section 120 takes in an image of the image capture object by a resolution set in advance. Note that the image capture section 120 carries out image capture a plurality of times upon one shutter click. A plurality of pieces of captured image data obtained after the click of the shutter button serves as captured image data that are subject to transmission to the image output apparatus 500.

Upon detection of a shutter click while the text image capture mode is being selected, the captured image determination section 130 determines whether or not the one or plurality pieces of captured image data obtained by the image capture is an appropriate image data in which no blown-out highlights or loss of shadow detail is included. Alternatively, the captured image determination section 130 may determine whether or not image data of one or a plurality of viewer images taken in beforehand by the image capture section 120 is appropriate image data in which no blown-out highlights or loss of shadow detail is included. The captured image determination section 130 supplies a determined result to the control section 110. Processes carried out by the captured image determination section 130 are described later in detail.

The image processing section 140 carries out at least an A/D conversion process with respect to the data of the image taken in by the image capture section 120.

The communication section 150 has functions of serial/parallel transfer and wireless data communication, which are in conformity with USB (Universal Serial Bus) 1.1 or USB 2.0 Standard. The communication section 150 transmits, to the image output apparatus 500, the captured image data which has been subjected to the A/D conversion process in the image processing section 140.

The storage section 160 serves as a section in which (i) the program for carrying out the processes in the portable terminal apparatus 100, (ii) information on a model of the portable terminal apparatus 100, (iii) user information, and (iv) data required for carrying out the processes are stored. Note that the user information refers to information for identifying the user of the portable terminal apparatus 100, such as a user ID and a password.

The display section 170 is constituted of for example a liquid crystal display or the like. Moreover, the input section 180 has a plurality of buttons, for allowing the user to enter data therethrough.

The recording medium accessing section 190 reads out a program from a recording medium 1000 that records the program, which program is used for carrying out processes of the portable terminal apparatus 100.

The control section 110 carries out control with respect to the sections of the portable terminal apparatus 100. The control section 110 attaches, to the captured image data obtained by carrying out image capture upon the shutter click, a file name, and information of a model of the portable terminal apparatus 100, user information, and output processing information, which are stored in the storage section 160. The control section 110 further causes the communication section 150 to execute a transmission process to the image output apparatus 500.

(3) Processes carried out by Captured Image Determination Section

The following description discusses how the captured image determination section 130 of the portable terminal apparatus 100 carries out the determination processes of specific process execution requirements.

(3-1) Determination of Skew

As described earlier, the user selects the text image capture mode in a case where the user carries out image capture with respect to the image capture object, which has a rectangular shape, such as a document, and desires to obtain a high resolution image. Therefore, the captured image determination section 130 assumes that the image capture object has a rectangular shape, and detects a skew of the image capture object in the captured image data (hereinafter referred to as image capture figure) by detecting an edge of the image capture figure. Note that a conventionally known method can be employed as a method for detecting, in a captured image indicated by the captured image data, a pixel located on the edge of the image capture figure. In order to prevent a background edge from being erroneously determined to be the edge of the image capture figure, it is alternatively possible to detect as an edge of the image capture figure only in a case where an edge having a length of not less than a given length is detected. In this case, the given length can be set, for example, to a length which is approximately 80% of a length of an end side of an image in the captured image data. Alternatively, it is also possible to cause the user to select the edge of the image capture object from the edges thus detected. It is possible to employ, as such an edge detection method, a technique disclosed in Japanese Patent Application Publication, Tokukai, No. 2006-237757 A.

Figure 5:
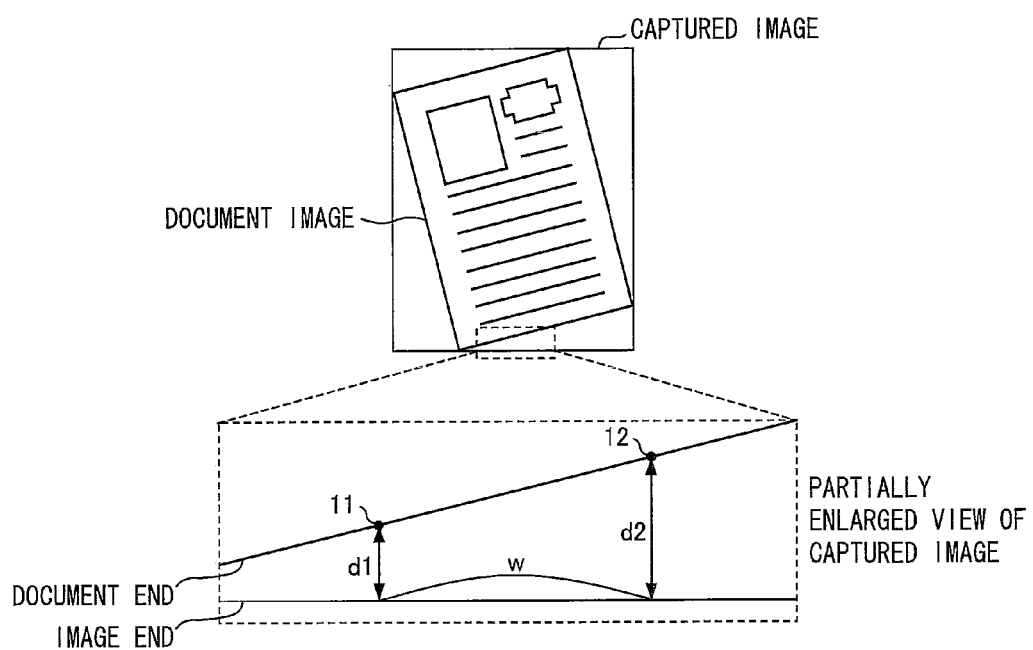
FIG. 5 illustrates an example of detection of a skew of an image which detection is carried out in the captured image processing method of the present invention.
Figure 7:
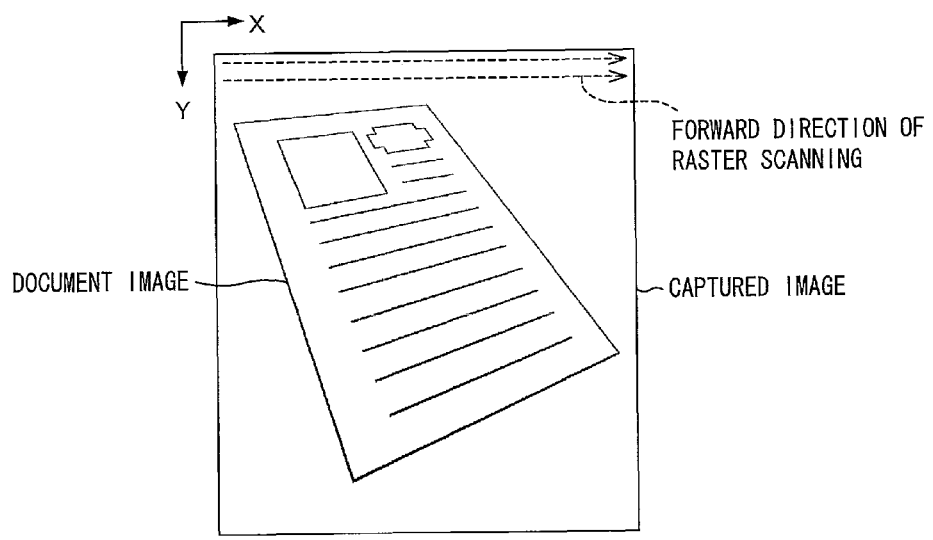
FIG. 7 illustrates an example of detection of a geometric distortion of an image.

The captured image determination section 130 selects two points located on the detected edge of the image capture figure. For example, the captured image determination section 130 selects two points 11 and 12 which are away from a perpendicular line that bisects a captured image indicated by the captured image data by w/2 in a transverse direction to the right and left, respectively (see FIG. 5). Next, it is possible to determine a skew of the document image in the captured image by determining distances d1 and d2 between an end side of the captured image indicated by the captured image data and the respective selected two points 11 and 12. In the case of FIG. 5, when an angle of the skew is indicated as θ, tan θ=(d2−d1)/w. Then, the captured image determination section 130 calculates a value of (d2−d1)/w and reads out a corresponding angle θ, for example, from a table (refer to FIG. 6) which is prepared in advance.

Subsequently, the captured image determination section 130 determines whether or not the detected angle θ falls within a given range (e.g., −30° to +30°) and supplies a determined result to the control section 110. Note here that it is one of the process execution requirements that the angle θ falls within the given range.

(3-2) Determination of Geometric Distortion

As described earlier, the geometric distortion means that in a case where image capture is obliquely carried out with respect to the image capture object from a direction different from the normal direction of the plane of the image capture object on which plane the text image is formed, an image capture figure has, in the captured image, a distorted shape instead of the rectangular shape. For example, in a case where image capture is carried out with respect to the image capture object obliquely, i.e., from a lower left direction with respect to a normal direction of the paper, an image of the paper has a distorted quadrangular shape (see FIG. 7).

As described later, according to the present embodiment, the image output apparatus 500 has a function of correcting such a geometric distortion. Note, however, that in a case where the geometric distortion occurs to a large degree, readability will not be so enhanced even if the geometric distortion is corrected. In view of this, the captured image determination section 130 of the present embodiment detects features indicative of a degree of the geometric distortion so as to determine whether or not the features fall within a given range.

With the present embodiment, edges of respective sides of the image capture object do not necessarily exist in the vicinity of a center of the angle of view. In view of this, according to the present embodiment, edges are extracted, at given regular intervals, from all sides, line segments identified by the respective edges are found, and intersections of these line segments are calculated, thereby defining a region where the image capture object is located.

First, the captured image determination section 130 carries out a raster scanning with respect to the captured image data. Note here that (i) a forward direction and (ii) a direction which is perpendicular to the forward direction are an X direction and a Y direction, respectively (see FIG. 7). Note also that an upper left corner is an origin in the captured image.

In a case where no edge is detected as a result of the scanning carried out with respect to one (1) line, the captured image determination section 130 carries out the scanning with respect to a subsequent line which is away from the one line by a predetermined distance in the Y direction. Note that an interval between the lines is not limited to a specific one, provided that it is a fixed one. Further, the line is not necessarily constituted by a single pixel.

Next, in the raster scanning, the captured image determination section 130 regards, as L1 (a first line), a line on which an edge is firstly detected. The captured image determination section 130 classifies, into a first group, coordinates of a point determined to be the first edge in the forward direction, and then classifies, into a second group, coordinates of a point determined to be the second edge on the first line (see FIG. 8). The scanning is consecutively carried out with respect to a subsequent line so that an edge is detected. Then, with respect to each line Li, a difference in X-coordinate value between (a) a point firstly determined to be an edge of the image capture figure in the forward direction and (b) a point secondly determined to be an edge of the image capture figure in the forward direction (a distance di between X-coordinates of the two points) is found, and then an edge determination is carried out as below.

It is assumed that the X-coordinate of the first edge on the line Li is Xi1 (the X-coordinate belonging to the first group) and the X-coordinate of the second edge on the line Li is Xi2 (the X-coordinate belonging to the second group). The features detection method is carried out as below.

(a) Coordinates X11 and X12 on the first line (L1) are invariable.

(b) As for an ith line (i is an integer of not less than 2), an intercoordinate distance di1 (=Xi1−X(i−1)1) and di2 (=Xi2−X(i−1)2) are found. Note that the following description discusses di1, and so omits a suffix 1. Same applies to di2.

(c) As for an ith line (i is an integer of not less than 3), ddi=abs{(di)−di−1} is found. In a case where ddi≦th1 (≈a small value close to 0 (zero)), a coordinate Xi is classified into an identical group (the first group or the second group). Otherwise (in a case where ddi>th1), the coordinate X1 is classified into a different group (a third group or a fourth group).

(d) Only in a case where i=4, a process for deciding a group of X2 is carried out as an initial process. The process is carried out as below.
   i) dd3≦th1 and dd4≦th1→X2: identical group
   ii) dd3>th1 and dd4≦th1→X2: different group
   iii) dd3≦th1 and dd4>th1→X2: identical group
   iv) dd3>th1 and dd4>th1→X2: identical group Once a transition of X2 to the different group (the third group or the fourth group) occurs, it is unnecessary to check increase and decrease in ddi.

Such a process is carried out with respect to an entire image so that edge points are extracted for each of the groups. Then, coordinates of the edge points which belong to each of the groups are subjected to linearization by use of a method such as a method of least squares or the like. This allows a straight line, which is approximate to the edge points which belong to each of the groups, to be found. The straight line corresponds to sides of the captured image figure.

Figure 8:
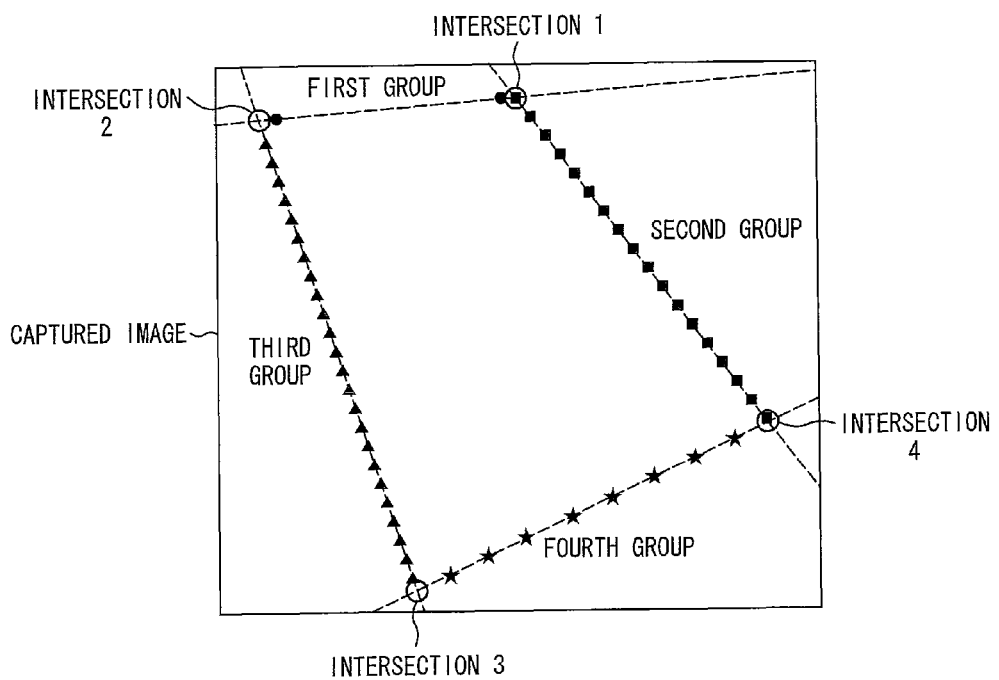
FIG. 8 illustrates an example of an edge detection process carried out with respect to an object in an image.

FIG. 8 is a drawing illustrating a case where edge points are extracted by the raster scanning in accordance with a process as mentioned above and classified into the four groups. Note, in FIG. 8, that a circle indicates an edge which belongs to the first group, a quadrangle indicates an edge which belongs to the second group, a triangle indicates an edge which belongs to the third group, and a star indicates an edge which belongs to the fourth group. Note also in FIG. 9 that straight lines, which have been subjected to the linearization by use of the method of least squares so as to be approximate to the edge points for each of the groups, are illustrated by respective dotted lines.

Then, intersections (intersections 1 through 4 illustrated in FIG. 9) of the straight lines for the respective four groups are found. This makes it possible to define a region surrounded by the four straight lines as a region where the image capture figure is located.

Further, a classifying process as mentioned above can be carried out with respect to an image which has been subjected to a 90-degree rotation. This also allows an extraction of edges of a document which is ideally provided so as to be parallel to a horizontal direction and a vertical direction of the image. Namely, the raster scanning allows a detection of an edge in the vertical direction in the image which has not been rotated. In contrast, the raster scanning allows a detection of an edge which was in the horizontal direction before the image was rotated (which is in the vertical direction after the image is rotated) in the image which has been rotated. This also allows an extraction of edges which are parallel to the vertical direction and the horizontal direction. As long as a sufficient amount of information is obtained (for example, not less than three intersections are obtained in each of the groups) before the rotation of the image, only this information can be used. In contrast, in a case where the number of intersections obtained is less than one in any one of the groups, it is obviously impossible to formulate a straight line. In such a case, intersections obtained after the rotation of the image can be used.

Alternatively, it is also possible to formulate a straight line by (i) carrying out again a coordinate conversion with respect only to found coordinates of an intersection, (ii) obtaining a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the image which has not been rotated and (ii) coordinates of intersections which coordinates are obtained by carrying out a coordinate conversion with respect to intersections found by the image which has been rotated.

Note that it is possible to extract an edge point in accordance with the following method. Pixel values, obtained in a small window which has a width of at least one pixel, are compared as they are (a sum or an averages of the pixel values are compared in a case where the width is not less than two pixels). In a case where pixel values of adjacent windows have a difference of not less than a given value, an edge point can be determined. In order to prevent a background edge or an edge of a text included in the image capture figure from being erroneously determined to be the edge of the image capture figure, it is alternatively possible to employ a method in which it is determined that an edge of the image capture figure is detected only in a case where an edge having a length of not less than a given length is detected. In this case, the given length can be set, for example, to a length which is approximately 80% of a length of an end side of a captured image in the captured image data. Alternatively, it is also possible to cause the user to select the edge of the image capture figure from the edges thus detected. It is possible to employ, as such an edge detection method, a technique disclosed in Japanese Patent Application Publication, Tokukai, No. 2006-237757 A. Alternatively, it is also possible to prevent such an erroneous detection by carrying out an evaluation of each of the coordinate groups or a process for detecting a line segment (e.g., a Hough transformation). Further, it is possible to prevent an edge of a text or a fine texture from being erroneously detected by carrying out a process employing a reduced image as preprocessing.

After finding the four straight lines and their intersections, the captured image determination section 130 calculates each ratio between lengths of opposite sides of the quadrangle defined by the four straight lines. The each ratio between the lengths can be easily calculated by use of the coordinates of the intersections. Note that the quadrangle has two pairs of the opposite sides and thus the captured image determination section 130 calculates a ratio between lengths for each of the two pairs.

Note here that the ratio between the lengths of the opposite sides is equal to 1 (one to one) in a case where image capture is carried out, from the front, with respect to the image capture object which has a rectangular shape, since the image capture figure included in the captured image also has a rectangular shape. In contrast, in a case where image capture is obliquely carried out with respect to the image capture object which has a rectangular shape, the ratio becomes a value different from 1. This is because the image capture figure included in the captured image has a distorted quadrangular shape. As a direction in which image capture is carried out is at a greater angle to the normal direction of the plane of the image capture object on which plane the text image is formed, a difference between a value of the ratio and 1 increases. It follows that the ratio between the lengths of the opposite sides is one of the features indicative of a degree of the geometric distortion.

Then, the captured image determination section 130 determines whether or not each of the two ratios that has been calculated falls within a given range (e.g., 0.5 to 2) and supplies a determined result to the control section 110. Note here that the given range is set in advance so that a geometric distortion correction can be made by the image output apparatus 500, and is stored in the storage section 160. Note also that it is one of the process execution requirements that each of the two ratios falls within the given range (e.g., 0.5 to 2).

Note that the captured image determination section 130 can use, as alternative features indicative of the degree of the geometric distortion, an angle formed by two selected straight lines through which any two adjacent intersections of the four intersections pass, which four intersections are the intersections detected as above.

(3-3) Determination of Offset Amount of Plurality of Images

The image output apparatus 500 carries out the high resolution correction in accordance with the plurality of pieces of captured image data of the identical image capture object. In order to carry out the high resolution correction, it is necessary that a given number of pieces of image data which varies depending on the magnification of resolution conversion be offset by a given amount. In view of this, the captured image determination section 130 of the present embodiment determines whether or not the plurality of pieces of captured image data (data of the images captured by the image capture section 120) include the given number of pieces of the captured image data which are required to carry out the high resolution correction and which are offset by the given amount.

Note that an offset, required for the high resolution correction which allows enhancement of text readability, intends an offset of less than one pixel (a decimal point) of target image data. Namely, an offset, which is below the decimal point (less than one pixel) such as that falls in a range of 0.3 to 0.7, is important. An offset corresponding to an integer part is not considered during the high resolution correction. For example, in the case of an offset corresponding to 1.3 pixel, 2.3 pixels, or the like each including an offset of less than one pixel, it is possible to carry out the high resolution correction in accordance with a plurality of images. In contrast, in the case of an offset of one pixel, two pixels, or the like each including no offset of less than one pixel, it is impossible to carry out the high resolution correction.

For example, in the case of a conversion magnification of ×2, the number of pieces of image data which is required for the high resolution correction is two (2). An offset amount of the decimal point of the two pieces of image data preferably falls in a range of 0.3 to 0.7, each of which is a result obtained when the offset is represented by a pixel. Therefore, information in which (i) a magnification of the resolution conversion "×2", (ii) the number of times of image capture "2", and (iii) a process execution requirement "required number of pieces of image data: 2, offset amount: 0.3 to 0.7" are associated with each other is stored beforehand in the storage section 160. In accordance with the information, the control section 110 controls (i) the image capture section 120 to carry out image capture two consecutive times and (ii) the captured image determination section 130 to carry out a determination in accordance with the process execution requirement "required number of pieces of image data: 2, offset amount: 0.3 to 0.7".

In the case of a conversion magnification of ×4, the number of pieces of image data which is required for the high resolution correction is 4. In a case where one of the four pieces of data is assumed to be reference image data, amounts of offset of the decimal point of the other three pieces of image data with respect to the reference image data preferably fall in ranges of 0.2 to 0.3, 0.4 to 0.6, and 0.7 to 0.8, respectively, each of which is a result obtained when the offset is represented by a pixel. Therefore, information in which (i) a magnification of the resolution conversion "×4", (ii) the number of times of image capture "4", and (iii) a process execution requirement "required number of pieces of image data: 4, offset amount: 0.2 to 0.3, 0.4 to 0.6, and 0.7 to 0.8" are associated with each other is stored beforehand in the storage section 160.

Note that the following description discusses, for simplicity, a case in which the magnification of the resolution conversion "×2" is selected.

First, the captured image determination section 130 selects any one of the captured images. As for the selected captured image (hereinafter referred to as a first captured image), the captured image determination section 130 selects an offset detecting partial region from the region which is defined during the determination of the geometric distortion and in which the image capture object is located. Note here that the offset detecting partial region is used so that offset amounts of the remaining captured image (hereinafter referred to as a second captured image) with respect to the first captured image are obtained. Therefore, it is preferable to select the offset detecting partial region in which there occurs a great change in pixel value (there exists a clear pattern). As such, the captured image determination section 130 extracts the offset detecting partial region in accordance with the following method.

The captured image determination section 130 specifies a pixel, serving as a target pixel, existing in a centroid of the region where the image capture object is located. Subsequently, the captured image determination section 130 selects a region where n×n pixels including the target pixel are provided. The captured image determination section 130 judges whether or not the selected region satisfies the following selection requirement. In a case where the selected region satisfies the selection requirement, the region becomes the offset detecting partial region. In contrast, in a case where the selected region does not satisfy the selection requirement, the captured image determination section 130 selects another region in accordance with a given offset and carries out an identical determination with respect to the another region. This is how the offset detecting partial region is extracted.

Note here that examples of the selection requirement include the following two requirements.

According to the first example of the selection requirement, a value which is based on a variance obtained in the region is used. A variance (x) obtained in the offset detecting partial region is expressed as the following expression (1), where P (x) is a pixel value of a region, in the vicinity of the target pixel, in which region n×n pixels are provided. The selection requirement is met when the variance (x) is not less than a given threshold. For simplicity, only a numerator of the expression (1) can be considered.

[Math. 1]

$$Varience(x) = \frac{n \times \sum_{i=0}^{n-1} [P(i)]^2 - \left[\sum_{i=0}^{n-1} P(i)\right]^2}{n \times n} \qquad \text{expression (1)}$$

Figures 9, 10:
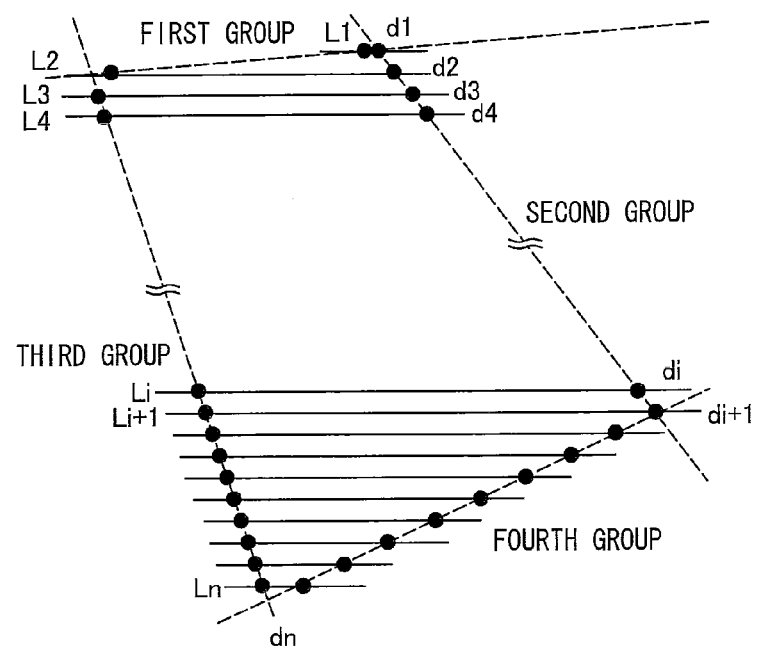
FIG. 9 illustrates an example of detection of an edge of an image in a raster direction.
FIG. 10 shows an example of a first order differential filter used in detection of a degree of offset between images, which detection is carried out by an image output apparatus of the present invention.

According to the second example of the selection requirement, binarization is carried out, by an edge extraction filter such as a first order differential filter, with respect to the region, in the vicinity of the target pixel, in which region n×n pixels are provided, and a sum total of binarized values is used. FIG. 10 shows an example of the first order differential filter. Similar to the first example of the selection requirement, the second selection requirement is met when the sum total is not less than a given threshold (e.g., not less than 5% of the number of pixels in the offset detecting partial region).

Next, in contrast to an offset detecting partial image A (n×n) of the first captured image, an offset detecting partial image B (m×m) (m>n) is cut out from the second captured image, the offset detecting partial image B having a center substantially identical to that of the offset detecting partial image A. The offset detecting partial image B is cut out so that coordinates of a central pixel of the offset detecting partial image A in the first captured image coincide with coordinates of a central pixel of the offset detecting partial image B in the second captured image.

Then, a region of the clipped offset detecting partial image B which region best matches the offset detecting partial image A is determined with sub-pixel-level accuracy. This can be realized by employing a normalized correlation pattern matching in which the offset detecting partial image A serves as a template.

As an example of the normalized correlation pattern matching, a correlation is obtained by use of a well-known normalized correlation equation. A correlation equation of two patterns of Input (I) and Target (T) which include N pixels can be generally expressed as the following expression (2). Note here that α, β, and γ can be expressed as below.

[Math. 2]

$$S = \{\alpha / \sqrt{\beta \times \gamma}\} \qquad \text{expression (2)}$$

[Math. 3]

$$\alpha = N\Sigma(I \times T) - (\Sigma I) \times (\Sigma T)$$

$$\beta = N\Sigma(I \times I) - (\Sigma I) \times (\Sigma I)$$

$$\gamma = N\Sigma(T \times T) - (\Sigma T) \times (\Sigma T)$$

A correlation value map of 3×3 is obtained, in a case where, for example under the requirement of n=5 and m=7, the above correlation equation is calculated for each region (n×n) of the offset detecting partial image B (m×m), which each region has an identical size to the offset detecting partial image A. A fitting quadric surface is calculated by use of the correlation value map. The quadric surface is calculated based on an equation S (x, y)=a×x×x+b×x×y+c×y×y+d×x+e×y+f. Specifically, six points each of which has a higher correlation value are selected from nine points, and simultaneous equations are solved so that each coefficient is obtained. It is determined that the process execution requirement "required number of pieces of image data: 2, offset amount: 0.3 to 0.7" is met, in a case where values below the decimal point of coordinate values (both x and y) of an extreme value (=a maximum value) of the function S (x, y) fall within the given range (here, 0.3 to 0.7).

Note that an extreme value can be obtained by (i) carrying out partial differentiation with respect to the quadratic equation S (x, y), and then (ii) finding coordinates of a point where a corresponding partial differential coefficient is 0 (zero). In this case, it is more efficient to directly use correlation values ($S_1$ to $S_6$) because it is actually unnecessary to obtain each of the coefficients (a to f). Expressions (3) to be solved are as follows. Note here that an origin serves as a target window standard.

[Math. 4]

$$x = \frac{2 \times S_3 \times S_4 - S_5 \times S_2}{S_2^2 - 4 \times S_1 \times S_3} \qquad \text{expression (3)}$$

$$y = \frac{2 \times S_1 \times S_5 - S_2 \times S_4}{S_2^2 - 4 \times S_1 \times S_3}$$

Note that such determination of positional offset by use of the sub-pixel-level accuracy is carried out in at least one region, desirably in several regions.

Then, the captured image determination section 130 supplies to the control section 110 a determined result as to whether or not the process execution requirements are met.

(3-4) Determination of Blown-Out Highlights/Loss of Shadow Detail in Captured Image Digital image data often has its pixel values in a range of 8 bits (0 to 255), which pixel value is a concentration value indicative of a degree of contrast in the pixels. Usually, the pixels in colored digital image data have pixel values for each of color components (e.g., R, G, B). Further, luminance, which is features indicative of a degree of light and dark, can be calculated from the pixel values of the color components by use of a conventionally known equation (e.g., $Y_i=0.30R_i+0.59G_i+0.11B_i$, where $Y_i$ denotes luminance signal of pixel i, and $R_i, G_i, B_i$ are respective values of the color components (R, G, B) of the pixel i). In the present embodiment, a luminance calculated as such of a color (white) having 100% reflection with respect to the subject is represented as "255", which is a maximum value within an obtainable range, and a luminance calculated as such of a complete black color is represented as "0", which is a minimum value within the obtainable range. The portable terminal apparatus 100 also prepares captured image data in which the pixel values are indicated by 8 bits.

Also with the portable terminal apparatus 100, in a case where image capture is carried out by having the image capture object be overexposed, a highlighted part of a captured image becomes saturated. This causes blown-out highlights in the captured image data, which blown-out highlights is a phenomenon in which luminance of parts that are displayed having various pixel values in a case where image capture is carried out with an appropriate amount of exposure all becomes a value close to "255". Similarly, in a case where image capture is carried out by having the image capture object be underexposed, dark parts in the captured image become jet-black, thereby causing loss of shadow detail in the captured image data. The loss of shadow detail is that luminance of parts that are displayed with various pixel values in a case where image capture is carried out with an appropriate amount of exposure all becomes a value not more than, for example, "30".

Figure 21:
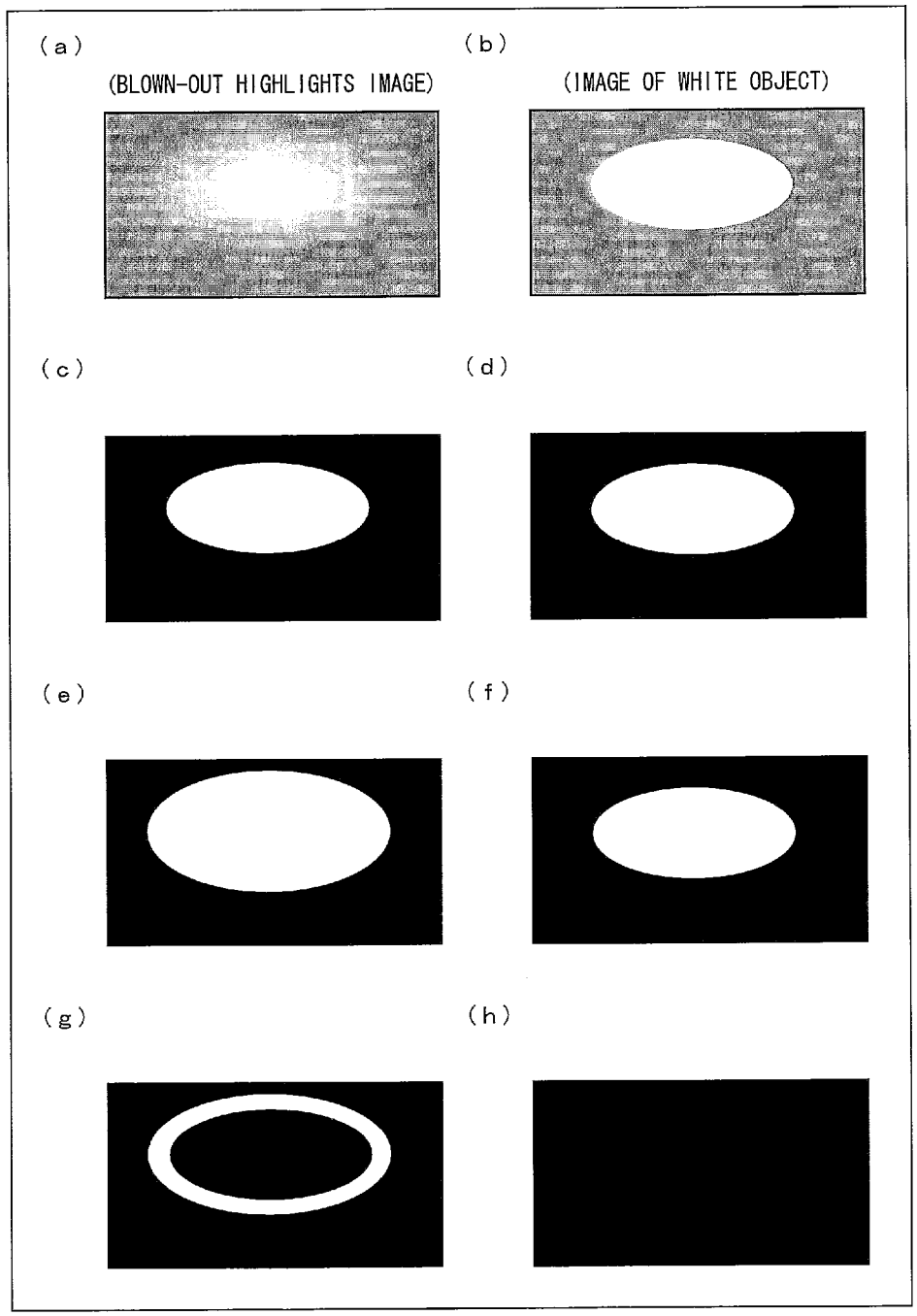
FIG. 21 is a view illustrating (i) captured images and (ii) binary images prepared by a captured image determination section of a portable terminal apparatus, for determining whether or not a captured image is an acceptable image.

The captured image determination section 130 carries out determination of blown-out highlights and loss of shadow detail, to determine whether the image is an optimum image including no blown-out highlights or loss of shadow detail. The following description deals with the determination of the blown-out highlights, with reference to (a) to (h) of FIG. 21. In FIG. 21, (a) illustrates an image including the blown-out highlights, and (b) of FIG. 21 illustrates an image displaying an originally white object. Further, (c) and (e) of FIG. 21 are images each illustrating a binarized image in which the image of (a) of FIG. 21 is binarized as described later, and (d) and (f) of FIG. 21 are images each illustrating a binarized image in which the image of (b) of FIG. 21 is binarized as described later. Furthermore, (g) and (h) of FIG. 21 are binarized images finally prepared for determining whether or not the blown-out highlights is included.

First, the captured image determination section 130 converts each of the pixel values in the captured image data to luminance values, by use of the following expression (4):

[Math. 5]

$$Y_j=0.30R_j+0.59G_j+0.11B_j \qquad \text{expression (4)}$$

Here, $Y_j$ is a luminance value of a respective pixel, and $R_j, G_j, B_j$ are values indicating the color components of the respective pixel.

Next, the captured image determination section 130 prepares a binarized image A (images (c) and (d) in FIG. 21) in which a high luminance region having a luminance of not less than a first threshold (e.g., luminance value of 250) is defined as "1" representing white, and a region other than that is defined as "0" representing black. Furthermore, the captured image determination section 130 prepares a binarized image B (images (e) and (f) in FIG. 21) in which a high luminance region having a luminance of not less than a second threshold (e.g., luminance value of 240) that is smaller than the first threshold is defined as "1" representing white and a region other than that is defined as "0" representing black.

Then, the captured image determination section 130 prepares a binary image (hereinafter referred to as XOR image) indicating an XOR (exclusive OR) of the binarized image A and the binarized image B. In a case where the prepared XOR image is one like the image illustrated in (g) of FIG. 21, that is, in a case where "1" is included in the XOR image, the captured image determination section 130 determines that the image includes blown-out highlight in a mid part surrounded by the pixels of "1". On the other hand, in a case where the prepared XOR image is one like the image illustrated in (h) of FIG. 21, that is, in a case where no "1" is included in the XOR image, the captured image determination section 130 determines that the image includes no blown-out highlight.

The following description explains a reasonable reason for determining the blown-out highlight by such a method.

It is considered that there are two types of high luminance regions: a part in which the blown-out highlights have occurred, and a part in which an originally white object is displayed (not that the blown-out highlight has occurred).

The part in which the blown-out highlights have occurred is characteristic in that as the part extends away from the part exposed to the spotlight the strongest, its luminance value gradually decreases. Namely, in the part in which the blown-out highlights have occurred, a high luminance region in the binarized image B is of a broader region than a high luminance region in the binarized image A; the high luminance region in the binarized image B including the high luminance region of the binarized image A therein. Therefore, with the XOR image of the binarized image A and the binarized image B, the "1" easily appears in a region in the high luminance region of the binarized image B but not in the high luminance region of the binarized image A (a region in the vicinity of the region in which the blown-out highlights have occurred).

In comparison, a region adjacent to the part in which an originally white object is displayed is usually a color other than "white", and does not correspond to a high luminance region. Namely, just a part in which the white object is displayed in both the binarized image A and the binarized image B is the high luminance region, and the region adjacent to the part in which the white object is displayed is usually neither the binarized image A, the binarized image B, nor the high luminance region. Consequently, the high luminance region of the binarized image A and the high luminance region of the binarized image B coincide with each other, and the "1" hardly appears in the XOR image of the binarized image A and the binarized image B.

The above description explains a reason why the determination method of the blown-out highlights is reasonable. Determination of the loss of shadow detail can be carried out in a method similar to the blown-out highlights determination.

Namely, the captured image determination section 130 prepares a binarized image C, in which a low luminance region having a luminance of not more than a third threshold (e.g., luminance value of 10) is defined as "0" representing black, and a region other than that is defined as "1" representing white. Furthermore, the captured image determination section 130 prepares a binarized image D, in which a low luminance region having a luminance of not more than a fourth threshold (e.g., luminance value of 30) that is greater than the third threshold is defined as "0" representing black and a region other than that is defined as "1" representing white.

Then, the captured image determination section 130 prepares an XOR image representing an XOR of the binarized image C and the binarized image D. In a case where "1" is included in the XOR image, the captured image determination section 130 determines that the image includes loss of shadow detail in the vicinity of the "1", and in a case where the XOR image includes no "1", the captured image determination section 130 determines that shadow detail is not lost.

The blown-out highlights determination process or the loss of shadow detail determination process is preferably carried out to image data of a viewer image that is taken in prior to the shutter click by the user. However, the determination process can be carried out to a captured image data obtained upon image capture by clicking the shutter button.

Moreover, the above description explains that in the case where the "1" is included in the XOR image, the XOR image includes the blown-out highlights or loss of shadow detail, and in the case where no "1" is included in the XOR image, the XOR image includes no blown-out highlights or loss of shadow detail. However, determination may be made that the image includes the blown-out highlights or loss of shadow detail in a case where the "1" is included in the XOR image by not less than a predetermined number, and that the image includes no blown-out highlights or loss of shadow detail in a case where the "1" is included in the XOR image by less than the predetermined number.

(4) Process Carried Out in Image Capture Section 120

Upon receiving a notification from the control section 110 that the captured image determination section 130 determines that the image includes the blown-out highlights, the image capture section 120 displays on the display section 170 a message informing that exposure conditions (e.g., aperture, shutter speed, gain) are to be modified. Thereafter, the exposure condition is automatically modified, and image capture of a plurality of pieces is carried out. In detail, upon detection of a shutter click, the image capture section 120 carries out image capture under a plurality of different exposure conditions, one or more images being captured per exposure condition.

(5) Transmission Data to Image Output Apparatus 500

As described above, after the captured image determination section 130 determines the captured image, the image capture section 120 carries out image capture of a same object under the plurality of different exposure conditions, one or more images being captured per exposure condition. The control section 110 assigns a file name to each of pieces of the captured image data per set of exposure conditions, so that the plurality of pieces of captured image data that are captured are associated with each other. The file names may be assigned, for example, in such a manner that just a numbered part is different but other parts have a common name, such as "ABC_1.jpg", "ABC_2.jpg" and so on. In this case, a different file name is assigned per exposure condition, and this file name is numbered for each of the plurality of pieces of the captured image data that are captured. For example, the file name may be one such as: "'file name related to image capture object'_'file name for distinguishing exposure condition (e.g., condition 1)'_'number'". Thereafter, the control section 110 causes transmission to the image output apparatus 500 of the plurality of pieces of the captured image data that are captured, which (i) information of a model of the portable terminal apparatus 100, (ii) user information, and (iii) output processing information are associated to the plurality of pieces of the captured image data that are captured.

In order to associate the plurality of pieces of the captured image data that are captured with each other, the control section 110 may prepare, per exposure condition, tag information for identifying specific captured image data from other captured image data. In this case, the control section 110 causes transmission to the image output apparatus 500 of the plurality of pieces of captured image data that are captured, which (i) tag information, (ii) information of a model of the portable terminal apparatus 100, (iii) user information, and (iv) output processing information are associated to the plurality of pieces of the captured image data that are captured.

(6) Arrangement of Image Output Apparatus

An arrangement of the image output apparatus 500 is described below, with reference to FIGS. 10, and 12 to 20. In the present embodiment, the image output apparatus 500 is a multifunction printer which has functions of a scanner, a printer, a copying machine, and the like.

Figure 12:
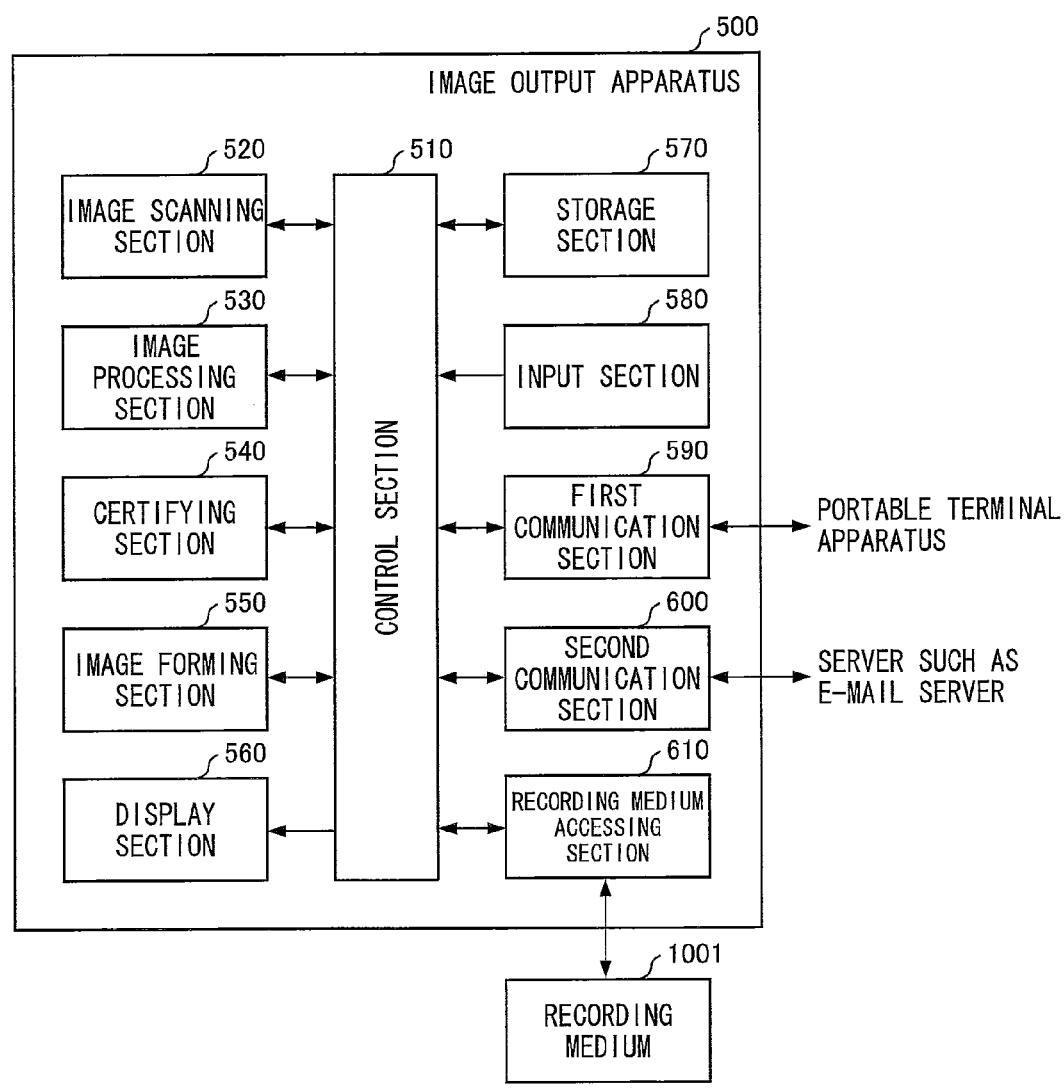
FIG. 12 is a block diagram illustrating an arrangement of an image output apparatus of the present invention.

FIG. 12 is a block diagram illustrating the arrangement of the image output apparatus 500. The image output apparatus 500 includes a control section 510, an image scanning section 520, an image processing section 530, a certifying section 540, an image forming section 550, a display section 560, a storage section 570, an input section 580, a first communication section 590, a second communication section 600, and a recording medium accessing section 610.

The image scanning section 520 scans a document and has a scanner section including a CCD (Charge Coupled Device) which converts light reflected from the document to an electric signal (an analogue image signal) which has been subjected to R, G, and B color separations. Then, the image scanning section 520 outputs this electric signal.

Figure 20:
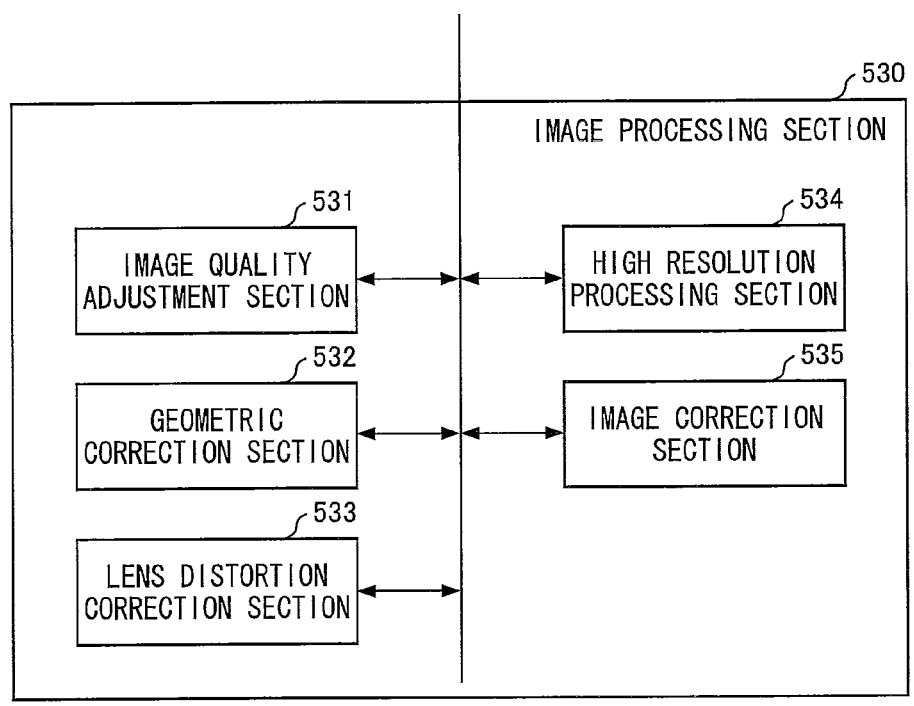
FIG. 20 is a block diagram illustrating details of an image processing section of an image output apparatus of the present invention.

The image processing section 530 carries out given image processing with respect to image data. According to the present embodiment, the image processing section 530 carries out image processing such as high resolution correction, with respect to the captured image data received from the portable terminal apparatus. As illustrated in FIG. 20, the image processing section 530 includes an image quality adjustment section 531, a geometric correction section 532, a lens distortion correction section 533, a high resolution processing section 534, and an image correction section 535. The image processing carried out with respect to the captured image data in the image processing section 530 will be described later in detail.

The certifying section 540 carries out user certification when the output process is carried out with respect to the captured image data received from the portable terminal apparatus 100. In detail, the certifying section 540 carries out the user certification by comparing (a) the user information received from the portable terminal apparatus 100 with (b) the user information (a user ID and a password) entered from the input section 580. The certifying section 540 transmits a certified result to the control section 510.

The image forming section 550 forms an image on recording paper such as paper by use of an electrophotographic printing method, an ink-jet method, or the like. That is to say, the image forming section 550 carries out printing processing, which is one of the output processes.

The display section 560 is realized by a liquid crystal display device, for example. The input section 580 is provided for entering data by, for example, touching a touch panel or pressing a button included in the liquid crystal display device.

The first communication section 590 has functions of the serial/parallel transfer and the wireless data communication which are carried out in conformity with the USB 1.1 or USB 2.0 Standard. The first communication section 590 receives, from the portable terminal apparatus 100, the plurality of pieces of captured image data to which the tag information, the file name, the information on the model of the portable terminal apparatus 100, the user information, and the output process information are added.

The second communication section 600 has the following functions (a) through (c): (a) data communication employing a wireless technology which is in conformity with any one of LAN standards IEEE 802.11a, IEEE 802.11b, and IEEE 802.11g, (b) data communication with a network, via a LAN cable, having a communications interface function employing Ethernet (registered trademark), and (c) data communication employing a wireless technology which is in conformity with any one of communication systems such as IEEE 802.15.1 (so-called Bluetooth (registered trademark) which is the wireless communication standard, the infrared communication standard such as IrSimple, and Felica (registered trademark).

The second communication section 600 carries out, as an output process, (i) a filing process for storing, in a server, captured image data which has been subjected to the high resolution correction, or (ii) an e-mail transmission process for transmitting an e-mail to which the captured image data which has been subjected to the high resolution correction is attached.

The recording medium accessing section 610 reads out a program from a recording medium in which the program is recorded. The storage section 570 serves as a section in which a program for causing the sections of the image output apparatus 500 to carry out their respective processes is stored.

The control section 510 carries out control with respect to the sections included in the image output apparatus 500. In detail, when the first communication section 590 receives the plurality of pieces of captured image data with which the tag information is associated, from the portable terminal apparatus 100, the control section 510 supplies the plurality of pieces of captured image data to the image processing section 530 so as to control the image processing section 530 to carry out the image processing. In addition, the control section 510 supplies, to the certifying section 540, the user information added to the image data so as to control the certifying section 540 to carry out a certification process. When receiving, from the certifying section 540, a certified result that the certification has been successfully carried out, the control section 510 controls the corresponding process to be carried out in accordance with the output process information added to the captured image data. Namely, in a case where the output process information is indicative of the printing process, the control section 510 controls the image forming section 550 to carry out the printing in accordance with the captured image data to which image processing is carried out by the image processing section 530 and is selected as an optimum image including no blown-out highlights or loss of shadow detail. Alternatively, in a case where the output process information is indicative of the filing process or the e-mail transmission process, the control section 510 controls the second communication section 600 to carry out the filing process or the e-mail transmission process in accordance with the captured image data which has been subjected to the image processing by the image processing section 530.

(6) Image Processing Carried Out by Image Processing Section

The image processing carried out by the image processing section 530 is described below in detail.

Note that the description below discusses details of the image processing carried out with respect to the plurality of pieces of captured image data, received from the portable terminal apparatus 100, though the image processing section 530 also carries out the image processing with respect to the image data scanned by the image scanning section 520.

In the present embodiment, the image processing section 530 carries out, with respect to the captured image data received from the portable terminal apparatus 100, correction of color balance and the like, correction of geometric distortion and lens distortion, and high resolution correction. The following description explains each of these processes.

(6-1) Color Balance Correction, Contrast Correction, and Luminance Correction

The image quality adjustment section 531 of the image processing section 530 carries out color balance and contrast correction.

Figures 16, 17:
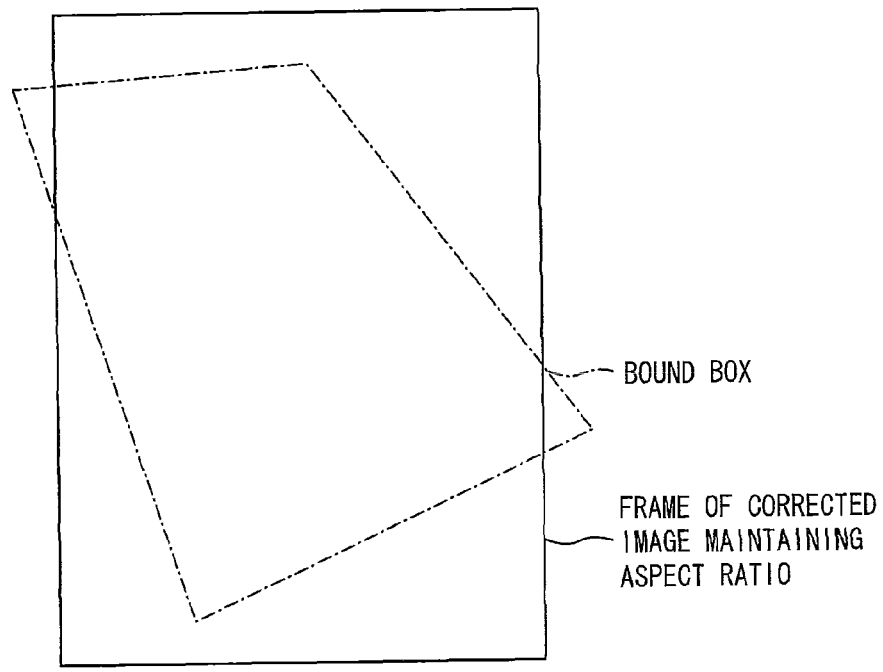
FIG. 16 illustrates an example of a geometric skew correction of an image.
FIG. 17 illustrates one example of a look-up table used during detection of a color balance of an image.

A color balance can be corrected in accordance with a method in which the image quality adjustment section 531 finds maximum and minimum values of the received captured image data for each of the color channels, prepares look-up tables which cause the color channels to have uniform maximum and minimum values, and apply the look-up tables to the respective color channels. FIG. 17 shows an example of the look-up tables. As shown in FIG. 17, in a case where (i) a given channel has a maximum value of MX and a minimum value of MN and (ii) the data has 8 bits, a look-up table can be prepared that causes an increase from MN in increments of (MX−MN)/255.

Moreover, the image quality adjustment section 531 carries out the contrast correction in a similar manner to the color balance correction. Note that the look-up tables applied to the respective color channels can be identical in a case where it is unnecessary to change a color balance to a specific one.

Note that an alternative publicly-known technique can be applied to the color balance and contrast corrections.

(6-2) Correction of Geometric Distortion and Lens Distortion

The lens distortion correction section 533 of the image processing section 530, like the processes carried out by the captured image determination section 130, sequentially detects, by the raster scanning, points on an edge of the image capture object in the captured image. Then, the lens distortion correction section 533 carries out a curve fitting with respect to the points detected on the edge, and carries out the lens distortion correction based on a curvilineal expression.

Figure 15:
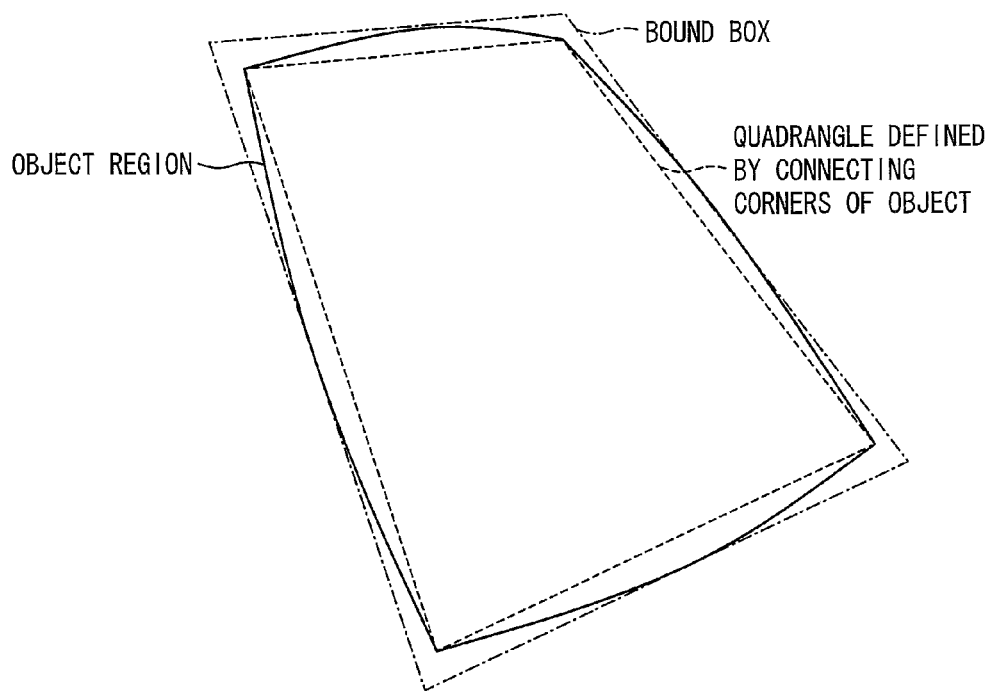
FIG. 15 illustrates an example of lens distortion correction of an image.

In detail, as illustrated by the solid line in FIG. 15, the lens distortion correction section 533 detects the edge points of the detected image capture figure and classifies, like the captured image determination section 130, the edge points into four groups which correspond to four sides of the image capture figure. Subsequently, the lens distortion correction section 533 carries out a quadratic curve approximation with respect to the edge points which belong to each of the four groups. Four quadratic curves thus determined with respect to the respective four groups correspond to the respective four sides of the image capture figure. In addition, the lens distortion correction section 533 finds four intersections of the four quadratic curves which intersections correspond to corner sections of a region defined by the four quadratic curves. Next, the lens distortion correction section 533 finds a bound box (see one-dot chain lines in FIG. 15) in which the four quadratic curves determined for the respective four sides are circumscribed, and which is similar to a quadrangle (see dotted lines in FIG. 15) defined by connecting the four intersections. Then, the lens distortion correction section 533 carries out a transformation to the location of pixels in a region where the image capture figure is located in the captured image so that the bound box calculated as such becomes the locations of the respective edge pixels of the image capture figure which have been subjected to correction. This transformation can be carried out by carrying out calculations in accordance with vectors from a reference point (e.g., the centroid of the region where the image capture figure is located). This allows the lens distortion, due to the image capture section 120 of the portable terminal apparatus 100, to be corrected.

Moreover, the geometric correction section 532 of the image processing section 530 carries out correction of the geometric distortion by the following method. The geometric correction section 532 may carry out mapping transformation for example as illustrated in FIG. 16, so that the bound box found as described above is adapted to an aspect ratio (e.g., 7:10 in a case of a A size, B size used in business documents) of the object. A publicly-known technique can be used as the mapping transformation. Note that the geometric correction section 532 can carry out the mapping transformation in accordance with an aspect ratio stored in the storage section 570 in advance or an aspect ratio entered from the input section 580.

Note that methods for geometric correction and lens distortion correction is not limited to the above methods and that publicly-known techniques can be employed for the correction.

(6-3) High Resolution Correction Using Plurality of Pieces of Image Data

The high resolution processing section 534 carries out high resolution correction to the captured image data received from the portable terminal apparatus 100. In the present embodiment, the high resolution processing section 534 carries out high resolution correction with respect to optimum captured image data selected by the image correction section 535 as including few blown-out highlights or loss of shadow detail among the plurality of pieces of the captured image data received from the portable terminal apparatus 100.

As for a method for forming a high resolution image in accordance with a plurality of pieces of image data, several methods are disclosed in the Journal of the Institute of Image Information and Television Engineers Vol. 62, No. 3, pp. 337 through 342 (published in 2008). Generally, the high resolution correction process includes a positioning process for a plurality of images and a reconstructing process. In the present embodiment, the normalized correlation pattern matching (see the description of (3-3)) is used as an example of a positioning process. Namely, it is possible to carry out the positioning for a plurality of images by displacing the plurality of images by an offset amount corresponding to an extreme value of the foregoing S (x, y).

Next, the high resolution processing section 534 of the image processing section 530 carries out the reconstructing process. Namely, the high resolution processing section 534 prepares reconstructed image data whose number of pixels corresponds to a magnification obtained after the resolution conversion. Note, however, that a reconstructed image is assumed to have a size identical to that of the captured image. Then, the high resolution processing section 534 determines pixel values of respective pixels in the reconstructed image data in the following method. Namely, the high resolution processing section 534 selects, from the plurality of captured images, a plurality of pixels of the captured image (captured image pixels) located in the vicinity of each of the pixels (reconstructed pixels) in the reconstructed image data, and then carries out an interpolation with respect to the reconstructed pixel in accordance with a general interpolation method (e.g., a linear interpolation method and a bi-cubic interpolation method).

Figure 14:
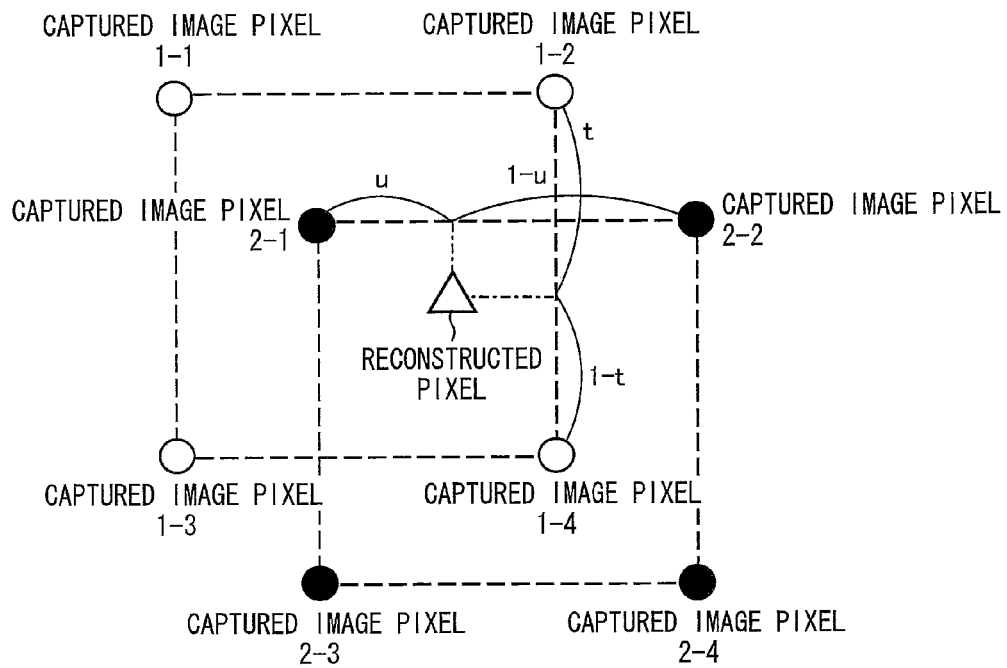
FIG. 14 illustrates a determination example of a reconstruction pixel value of an image.

In detail, as illustrated in FIG. 14, captured image pixels located in the vicinity of a target reconstructed pixel are selected. For example, two captured image pixels, whose line segment (see the dotted lines in FIG. 14) is the closest to the target reconstructed pixel, are selected in each of transverse and longitudinal directions. Assume here that the two captured image pixels selected in the transverse direction are a captured image pixel 1-2 (pixel value: $V_{i1\text{-}2}$: pixel values of the following captured image pixels will be similarly indicated) of a first captured image and a captured image pixel 1-4 of the first captured image, whereas the two captured image pixels selected in the longitudinal direction are a captured image pixel 2-1 of a second captured image and a captured image pixel 2-2 of the second captured image. Note that it is assumed that the captured image pixels located in the vicinity of the reconstructed pixel are selected from the plurality of pieces of captured image data which have been subjected to the geometric distortion correction and the lens distortion correction. This makes it possible to carry out the high resolution correction in a state where the geometric distortion and the lens distortion have already been corrected. Alternatively, a coordinate value obtained after the correction can be calculated by taking into consideration the geometric distortion correction and the lens distortion correction for the uncorrected plurality of pieces of captured image data. Namely, it is possible to (i) carry out the reconstruction process after only calculating correction values of the geometric distortion and the lens distortion, and then (ii) carry out the coordinate transformation by use of the correction values.

Subsequently, two intersections of (i) the line segments each of which is defined by the two points selected in the transverse and longitudinal directions and (ii) straight lines on each of which the target reconstructed pixel is located and each of which is perpendicular to a corresponding one of the line segments are found. In a case where the two intersections are internally dividing points of t:1-t and u:1-u on the respective two line segments (see FIG. 14), the high resolution processing section 534 can calculate a pixel value $V_s$ of the target reconstructed pixel in accordance with the following expression (5). It follows that the linear interpolation is carried out. Then, pixel values of all the reconstructed pixels are similarly calculated, so that it is possible to prepare reconstructed image data which has been subjected to the high resolution correction.

[Math. 6]

$$V_S = \{(1-t)V_{i1\text{-}2} + tV_{i1\text{-}4} + (1-u)V_{i2\text{-}1} + uV_{i2\text{-}2}\}/2 \qquad \text{expression (5)}$$

Note that an alternative interpolation method can be employed. Note also that a further method disclosed in the Journal of the Institute of Image Information and Television Engineers Vol. 62, No. 3, pp. 337 through 342 (published in 2008) can be employed. For example, it is possible to employ an interpolation method such as a MAP (Maximum A Posteriori) method in which an assessment function which corresponds to an assumptive posterior probability is first minimized so that the pixel values of all the reconstructed pixels are calculated.

(6-4) High Resolution Correction using Single Piece of Image Data

As described above, in the case where a plurality of pieces of the captured image data is received from the portable terminal apparatus 100, the image output apparatus 500 carries out high resolution correction with respect to the plurality of pieces of the captured image data. Alternatively, in a case where the image output apparatus 500 receives a single piece of captured image data, the high resolution correction can be carried out with respect to the single piece of the captured image data.

As for a method for forming a high resolution image in accordance with a single piece of image data, several methods are disclosed in the Journal of the Institute of Image Information and Television Engineers Vol. 62, No. 2, pp. 181 through 189 (published in 2008).

Generally, it is possible to carry out the high resolution correction by (i) detecting a direction of an edge of an image pattern so as to carry out an interpolation in accordance with the direction of the edge and (ii) carrying out a de-noising process so as to remove at least (a) a distortion due to the interpolation and (b) an influence of a noise component existing in an inputted image. This is described below in detail.

Figure 19:
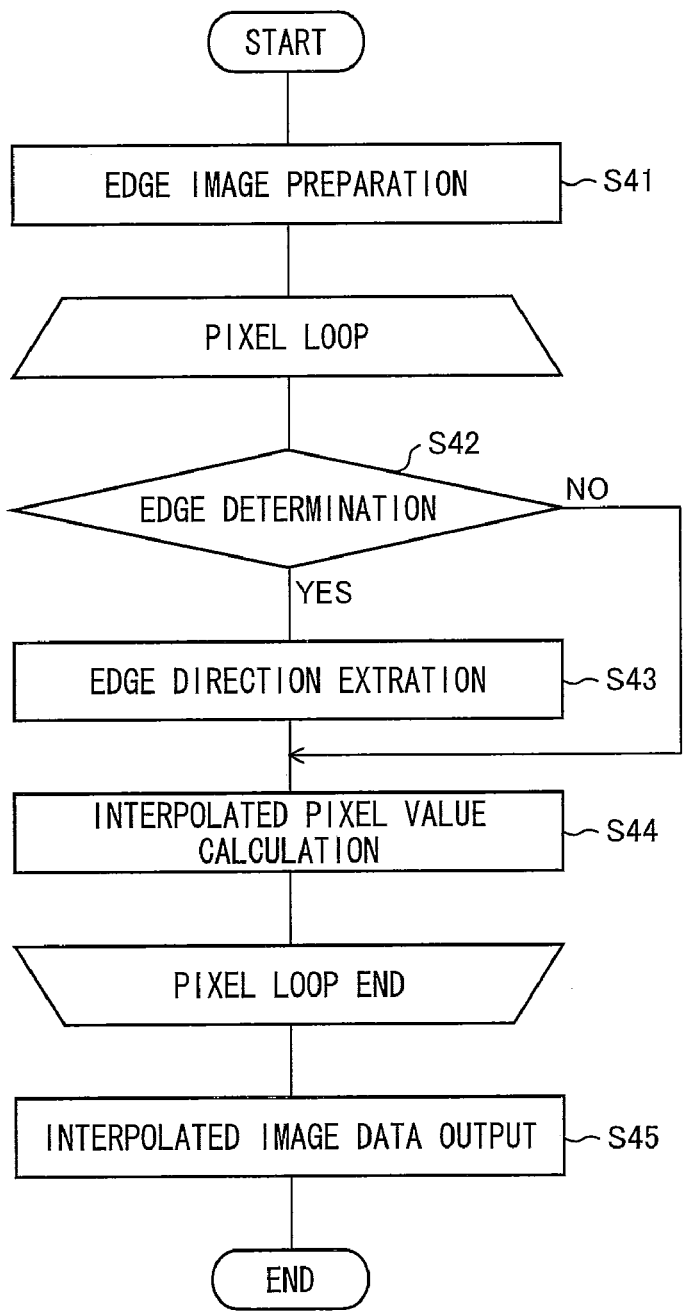
FIG. 19 is a flow chart illustrating one example of a high resolution process carried out in a captured image processing of an image output apparatus of the present invention.

FIG. 19 is a flow chart illustrating a processing flow of the high resolution correction carried out in the present embodiment.

Note that an example of a resolution conversion carried out at a magnification of ×2 in each of transverse and longitudinal directions is described here. In a case where (i) the resolution conversion is carried out at the magnification of ×2 and (ii) the number of pixels included in the captured image data which is to be subjected to the high resolution correction is n×m, the number of pixels included in the captured image data which has been subjected to the high resolution correction is 2n×2m. Such a high resolution correction (the resolution conversion carried out at the magnification of ×2) is carried out by preparing, as high resolution image data, image data including both reference pixels and interpolated pixels. The reference pixels are the respective pixels included in the captured image data, and the interpolated pixels are newly prepared in the middle of the respective reference pixels.

First, the image processing section 530 carries out an edge extraction with respect to the captured image data received by the first communication section 590. For example, the image processing section 530 carries out the edge extraction by use of a first order differential filter as shown in FIG. 10. Then, the image processing section 530 carries out a binarization process so as to prepare binarized image data (S41). Note that a pixel which has a pixel value of 1 in the binarized image data shows that the pixel is highly likely to be an edge.

Next, the image processing section 530 determines, in accordance with the binarized image data prepared in S41, whether or not a target pixel included in the captured image data is an edge (S42). Specifically, the image processing section 530 determines that the target pixel is an edge when a pixel, which corresponds to the target pixel in the binarized image data, has a pixel value of 1.

Note that the target pixel intends a pixel which is currently targeted in a case where the pixels in the captured image data are targeted in any order.

In a case where the target pixel is an edge (Yes in S42), the image processing section 530 detects an edge direction by use of a partial image corresponding to (N×N) pixels (N>1) which includes the target pixel (S43). In detail, the image processing section 530 determines whether or not each of the reference pixels in the partial image corresponding to (N×N) pixels is an edge pixel. Then, in a case where a reference pixel on the upper left of the target pixel and a reference pixel on the lower right of the target pixel are respective edge pixels, the image processing section 530 determines that the edge direction of the partial image is an upper left-lower right direction. Similarly, in a case where a reference pixel on the left of the target pixel and a reference pixel on the right of the target pixel are respective edge pixels, the image processing section 530 determines that the edge direction is a left-right direction. In a case where a reference pixel on the upper side of the target pixel and a reference pixel on the lower side of the target pixel are respective edge pixels, the image processing section 530 determines that the edge direction of the partial image is an upper-lower direction. In a case where a reference pixel on the upper right of the target pixel and a reference pixel on the lower left of the target pixel are respective edge pixels, the image processing section 530 determines that the edge direction of the partial image is an upper right-lower left direction.

In FIGS. 18(a) to 18(d), a dotted line indicates a detected edge direction. Note, in FIGS. 18(a) to 18(d), that pixels (1) through (9) are respective reference pixels and the pixel (5) is a target pixel. Note also that pixels A, B, and C are (i) an interpolated pixel between the reference pixels (1) and (5), (ii) an interpolated pixel between the reference pixels (2) and (5), and (iii) an interpolated pixel between the reference pixels (4) and (5), respectively.

Next, the image processing section 530 calculates, in accordance with the edge direction detected in S43, pixel values of the respective interpolated pixels A, B, and C which are located (i) on the upper left, (ii) on the upper side, and (iii) on the left, respectively, of the target pixel. Note here that the pixel values of the respective interpolated pixels are calculated by use of the reference pixels located in the edge direction.

In a case where the edge direction is the upper left-lower right direction, the reference pixels (1), (5), and (9) are respective edge pixels and a straight line connecting these pixels serves as an edge line (see FIG. 18(a)). Then, a pixel value VA (note that a written expression of "V" is omitted in FIG. 18(a) and this is applied to the other pixel values) of the interpolated pixel A located on the edge line is calculated based on the equation of VA=(V(1)+V(5))/2, by use of pixel values (a pixel value V(1) and a pixel value V(5)) of the reference pixel (1) and the reference pixel (5), respectively, each being adjacent to the interpolated pixel A located on the edge line.

In contrast, with respect to each of the interpolated pixels B and C located on no edge line, the interpolation is carried out by use of the reference pixels located on straight lines which (i) include the reference pixels which are different from those located on the edge line and the closest to the respective interpolated pixels B and C (hereinafter such a reference pixel is referred to as a closest reference pixel) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (6) (see FIG. 18(a)). Then, a point, which is perpendicularly drawn from the interpolated pixel B to the straight line, causes a line segment defined by the reference pixels (2) and (6) to be internally divided. Therefore, a pixel value VB of the interpolated pixel B is calculated by use of the following equation: VB=(9×V(2)+4×V(6))/13.

Similarly, a pixel value VC of the interpolated pixel C is calculated based on the equation of VC=(9×V(4)+4×V(8))/13, by use of (i) a pixel value of the reference pixel (4) which is the closest reference pixel value and (ii) a pixel value of the reference pixel (8) which is located on a straight line which includes the reference pixel (4) and is parallel to the edge direction.

In a case where the edge direction is the left-right direction, the reference pixels (4), (5), and (6) are edge pixels and a straight line connecting these pixels serves as the edge line (see FIG. 18(b)). Then, the pixel value VC of the interpolated pixel C located on the edge line is calculated based on the equation of VC=(V(4)+V(5))/2, by use of the pixel values (pixel values V(4) and V(5)) of the reference pixel (4) and the reference pixel (5), respectively, each being adjacent to the interpolated pixel C located on the edge line.

In contrast, with respect to each of the interpolated pixels A and B located on no edge line, the interpolation is carried out by use of the reference pixels located on straight lines which (i) include the reference pixels which are different from those located on the edge line and the closest to the respective interpolated pixels A and B (the closest reference pixels) and (ii) are parallel to the edge direction. For example, as for the interpolated pixel A, the straight line which (i) includes the reference pixel (1) or the reference pixel (2) which is the closest reference pixel and (ii) is parallel to the edge line is a straight line connecting the reference pixels (1) and (2) (see FIG. 18(b)). Then, a point, which is perpendicularly drawn from the interpolated pixel A to the straight line, exists in the middle of the reference pixels (1) and (2). Therefore, the pixel value VA of the interpolated pixel A is calculated by use of the following equation: VA=(V(1)+V(2))/2.

As for the interpolated pixel B, the straight line which (i) includes the reference pixel (2) which is the closest reference pixel and (ii) is parallel to the edge line is a straight line connecting the reference pixels (1), (2), and (3). Then, a point, which is perpendicularly drawn from the interpolated pixel B to the straight line, coincides with the reference pixel (2). Therefore, the interpolated pixel B is set to have the pixel value VB which is identical to the pixel value V(2) of the reference pixel (2).

In a case where the edge direction is the upper right-lower left direction, the reference pixels (3), (5), and (7) are edge pixels and a straight line connecting these pixels serves as the edge line (see FIG. 18(c)). Then, none of the interpolated pixels A, B, and C exists on the edge line.

As for the interpolated pixel A, the reference pixels (1), (2), and (4) are the closest reference pixels. Note here that the reference pixels (2) and (4) are located on a single straight line which is parallel to the edge direction, whereas the reference pixel (1) is not located on the single straight line. In view of this, the pixel value VA of the interpolated pixel A is calculated based on the equation of VA=(V(1)+V(2))+V(4)/3, by use of the pixel values of the respective reference pixels (1), (2), and (4) which are the closest reference pixels.

In contrast, with respect to each of the interpolated pixels B and C, the interpolation is carried out by use of the reference pixels located on straight lines which (i) include the reference pixels which are different from those located on the edge line and the closest to the respective interpolated pixels B and C (the closest reference pixels) and (ii) are parallel to the edge direction. For example, as for the interpolated pixel B, the straight line which (i) includes the reference pixel (2) which is the closest reference pixel and (ii) is parallel to the edge line is a straight line connecting the reference pixels (2) and (4) (see FIG. 18(c)). Then, a point, which is perpendicularly drawn from the interpolated pixel B to the straight line, causes a line segment defined by the reference pixels (2) and (4) to be internally divided. Therefore, the pixel value VB of the interpolated pixel B is calculated by use of the following equation: VB=(9×V(2)+4×V(4))/13.

Similarly, the pixel value VC of the interpolated pixel C is calculated based on the equation of VC=(4×V(2)+9×V(4))/13, by use of (i) the pixel value of the reference pixel (4) which is the closest reference pixel value and (ii) the pixel value of the reference pixel (2) which is located on the straight line which includes the reference pixel (4) and is parallel to the edge direction.

In a case where the edge direction is the upper-lower direction, the reference pixels (2), (5), and (8) are edge pixels and a straight line connecting these pixels serves as the edge line (see FIG. 18(d)). Then, the pixel value VB of the interpolated pixel B located on the edge line is calculated based on the equation of VC=(V(2)+V(5))/2, by use of the pixel values of the respective reference pixels (2) and (5) each being adjacent to the interpolated pixel B located on the edge line.

In contrast, with respect to each of the interpolated pixels A and C located on no edge line, the interpolation is carried out by use of the reference pixels located on straight lines which (i) include the reference pixels which are different from those located on the edge line and the closest to the respective interpolated pixels A and C (the closest reference pixels) and (ii) are parallel to the edge direction. For example, as for the interpolated pixel A, the straight line which (i) includes the reference pixel (1) or the reference pixel (4) which is the closest reference pixel and (ii) is parallel to the edge line is a straight line connecting the reference pixels (1) and (4) (see FIG. 18(d)). Then, a point, which is perpendicularly drawn from the interpolated pixel A to the straight line, exists in the middle of the reference pixels (1) and (4). Therefore, the pixel value VA of the interpolated pixel A is calculated by use of the following equation: VA=(V(1)+V(4))/2.

As for the interpolated pixel C, the straight line which (i) includes the reference pixel (4) which is the closest reference pixel and (ii) is parallel to the edge line is a straight line connecting the reference pixels (1), (4), and (7). Then, a point, which is perpendicularly drawn from the interpolated pixel C to the straight line, coincides with the reference pixel (4). Therefore, the interpolated pixel C is set to have the pixel value VC which is identical to the pixel value V(4) of the reference pixel (4).

Note that information, in which (i) an edge direction and (ii) equations for calculating the pixel values of the respective interpolated pixels A, B, and C are associated with each other, is preliminarily stored in the storage section 570. The image processing section 530 reads out, from the storage section 570, the equations associated with the edge direction detected in S43, and then can calculate the pixel values of the respective interpolated pixels A, B, and C with respect to the equations read out.

Note that FIGS. 18(a) to 18(d) illustrate only cases where the edges linearly extend. Note, however, that the edges can extend in a curved manner in the partial image corresponding to (N×N) pixels. Examples of the case include a case where the edge extends along the reference pixels (2)-(5)-(4) and a case where the edge extends along the reference pixels (1)-(5)-(7). Even in each of such cases, information, in which (i) edge directions and (ii) equations for calculating pixel values of respective interpolated pixels A, B, and C are associated with each other, is preliminarily stored. For example, in the case where the edge extends along the reference pixels (2)-(5)-(4), equations similar to those in the cases of FIGS. 18(c), 18(b), and 18(d) are stored with respect to the interpolated pixels A, B, and C, respectively. Similarly, in the case where the edge extends along the reference pixels (1)-(5)-(7), equations similar to those in the cases of FIGS. 18(a), 18(a), and 18(d) are stored with respect to the interpolated pixels A, B, and C, respectively. Also in a case where the edge extends differently from the above, the foregoing information is similarly stored.

As described above, the image processing section 530 calculates the pixel values of the respective interpolated pixels located in the vicinities of the respective reference pixels which have been determined to be the edge pixels.

In contrast, in a case where the target pixel is not an edge (No in S42), the image processing section 530 calculates, by a general interpolation calculating method (e.g., a bilinear interpolation method or a bicubic interpolation method), the pixel values of the respective interpolated pixels A, B, and C which are located (i) on the upper left side, (ii) on the upper side, and (iii) on the left side, respectively, of the target pixel so as to be adjacent to the target pixel (S44).

The image processing section 530 carries out the processes S42 through S44 with respect to all the reference pixels included in one image data. This causes interpolated image data including both the reference pixels and the interpolated pixels to be prepared (S45).

Thereafter, the image processing section 530 carries out an image quality enhancement process with respect to the interpolated image data thus prepared. For example, the interpolated image data is subjected, by the image processing section 530, to a de-noising filter, a sharpening filter, and the like so that high resolution image data is prepared. Examples of the sharpening filter include a conventional unsharp mask and a filter in which a coefficient at the center of FIG. 10 is set to five (5). Note that a median filter is widely known as the de-noising filter. As for a more sophisticated method for the image quality enhancement, a Bilateral filter [Proceedings of the 1998 IEEE International Conference on Computer Vision] or the like can be used as a method having both an edge preserving property and an image quality enhancing property.

Note that a method for preparing high resolution image data is not limited to the methods described above, and the image processing section 530 can prepare the high resolution image data in accordance with a single piece of captured image data by use of a variety of methods as disclosed in the Journal of the Institute of Image Information and Television Engineers Vol. 62, No. 2, pp. 181 through 189 (published in 2008).

(7) Image Processing Method of Captured Image Processing System

Figure 3:
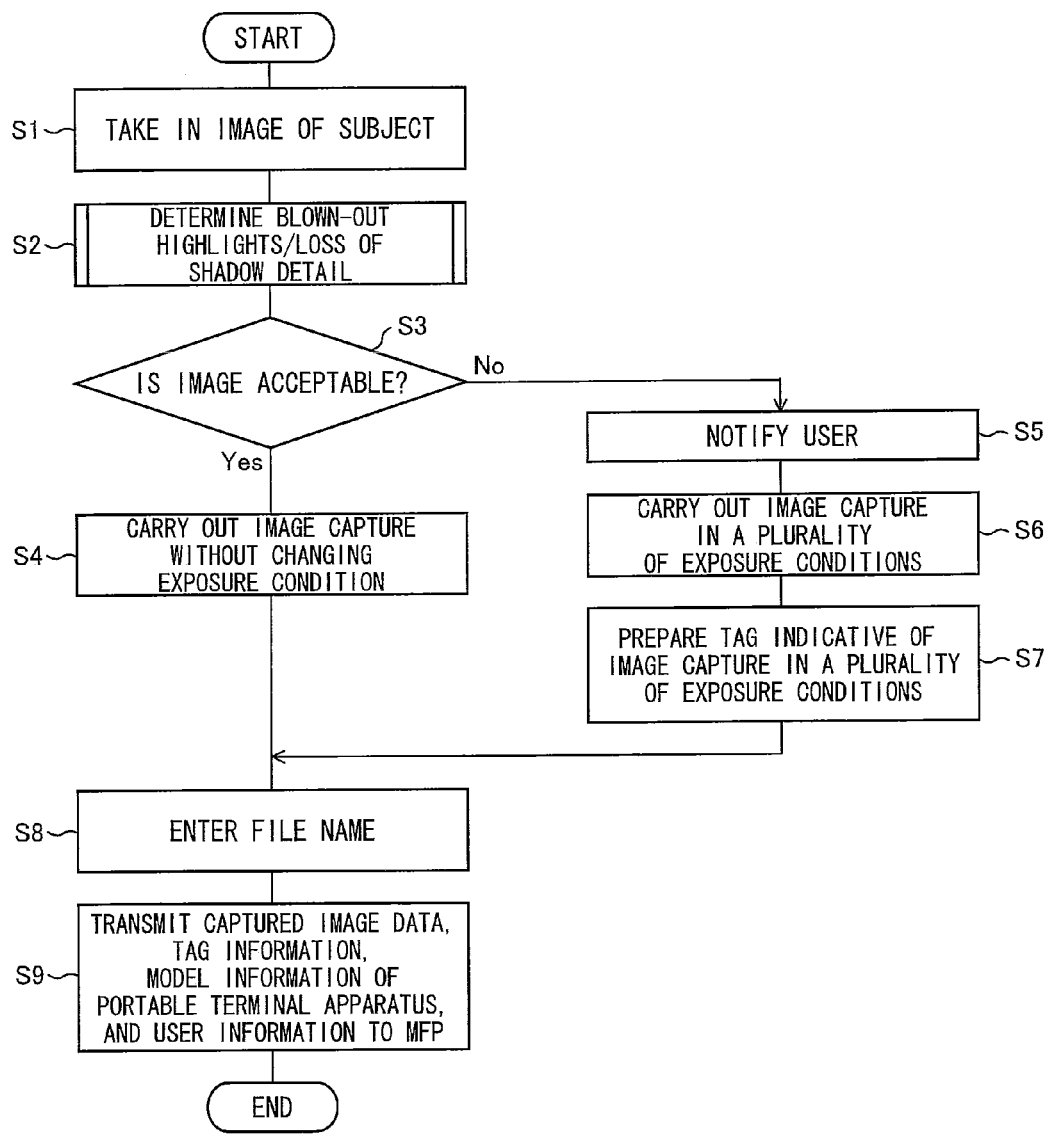
FIG. 3 is a flow chart illustrating one example of a captured image processing of a portable terminal apparatus of the present invention.
Figure 13:
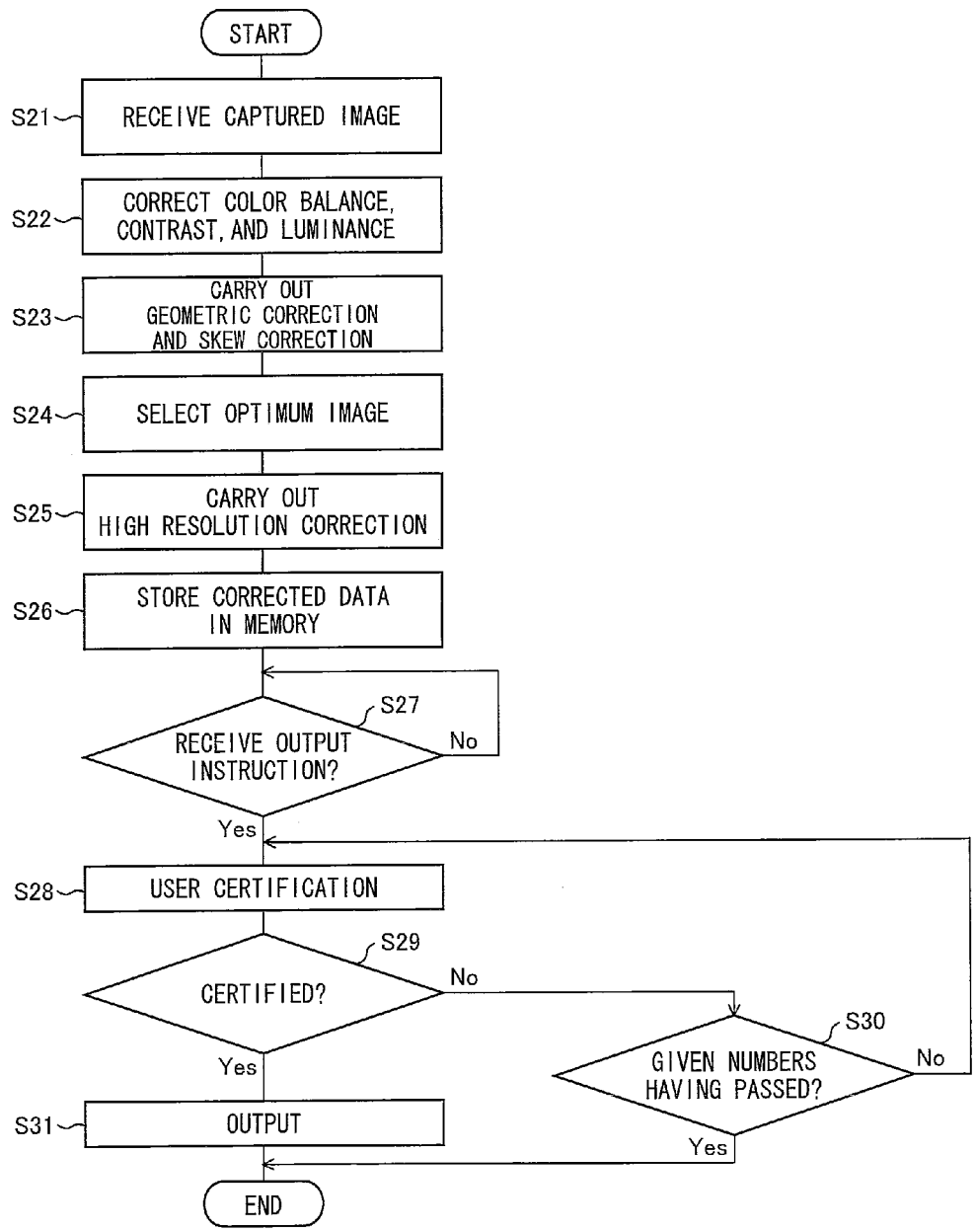
FIG. 13 is a flow chart illustrating a captured image processing of an image output apparatus of the present invention.

The following description explains a processing flow in the captured image processing system, with reference to FIGS. 3 and 13. FIG. 3 shows a flow chart of processes carried out by the portable terminal apparatus 100, and FIG. 13 shows a flow chart of processes carried out by the image output apparatus 500.

First, the portable terminal apparatus 100 accepts selection of the image capture mode. Here, the user selects the text image capture mode in a case where the user wishes to (i) carry out image capture of an image capture object having a rectangular shape on which a text image is included, such as a paper or a display screen, and (ii) output this captured image to the image output apparatus 500.

In the portable terminal apparatus 100 which accepts entry of selecting the text image capture mode, the control section 110 causes the display section 170 to display a screen urging the user to enter a magnification of resolution conversion to be used in carrying out the high resolution correction, and acquires the entered magnification through the input section 180. The control section 110 then determines, in accordance with the acquired magnification, the number of times image capture is to be carried out by the image capture section 120, and also determines one part of a process execution condition in the captured image determination section 130. Moreover, the control section 110 causes the display section 170 to display a screen to urge the user to enter a type of the output process and setting conditions for the output process, and acquires the output processing information through the input section 180.

Thereafter, once the output processing information is acquired by the control section 110 through the input section 180, the image capture section 120 starts taking in the image of the image capture object (S1). The control section 110 then causes display on the display section 170 of an image obtained by the image being subjected to A/D conversion by the image processing section 140. Note that, hereinafter, an image which is displayed on the display section 170 however is not stored in the storage section 160 in a fixed manner is called a "viewer image".

Figure 4:
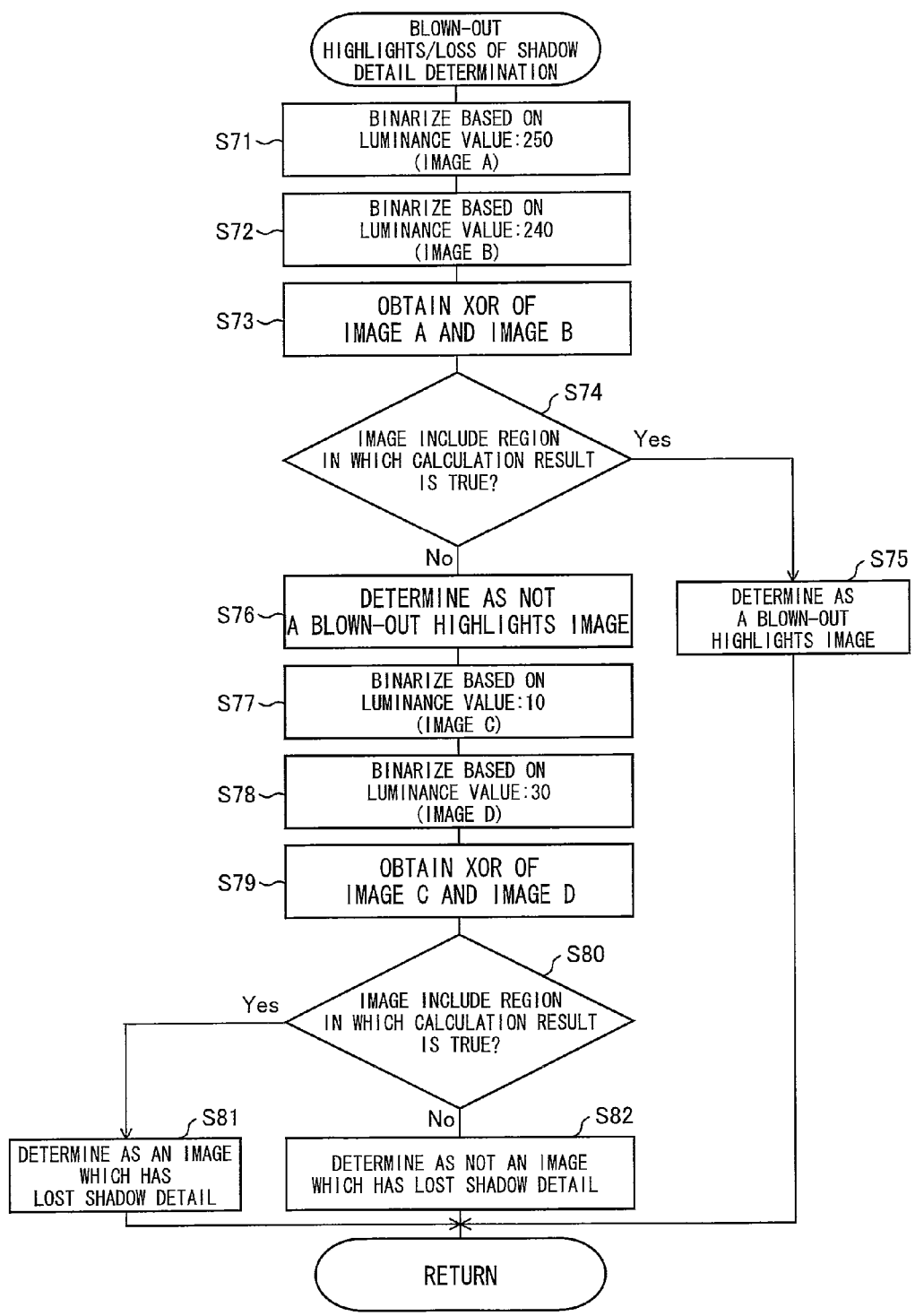
FIG. 4 is a flow chart illustrating a blow-out highlights/loss of shadow detail determination process, which is carried out in a captured image processing of a portable terminal apparatus of the present invention.

Upon detection of a shutter click, the captured image determination section 130 carries out determination of blown-out highlights or loss of shadow detail with respect to image data indicative of the captured image (or the viewer image) (S2). In the embodiment, the blown-out highlights or loss of shadow detail determination process is described in detail, with reference to FIG. 4. FIG. 4 is a flowchart which shows operations of the captured image determination section 130 in the blown-out highlights or loss of shadow detail determination process.

The captured image determination section 130 prepares, by the method described in (3-4), a binarized image A in which, in the captured image to be determined, a pixel having a luminance value of not less than 250 is defined as white (pixel value 1), and a pixel having a luminance value of less than 250 is defined as black (pixel value 0) (S71).

Similarly, the captured image determination section 130 prepares a binarized image B in which, in the captured image to be determined, a pixel having a luminance value of not less than 240 is defined as white (pixel value 1), and a pixel having a luminance value of less than 240 is defined as black (pixel value 0) (S72).

Furthermore, the captured image determination section 130 prepares a binary image (XOR image) that is obtained by obtaining the XOR of the binarized image A and the binarized image B (S73).

The captured image determination section 130 determines whether or not (i) the XOR image includes a pixel having the pixel value of "1" and (ii) a coordinate of the pixel having the pixel value of "1" is within a given range surrounding the region having the pixel value "1" in the binarized image A (S74). If the pixel having the pixel value of "1" is included in the given range (YES in S74), the captured image determination section 130 determines the XOR image as a blown-out highlights image (S75), and returns back to the process of S3 in FIG. 3. On the other hand, if no pixel having the pixel value of "1" is included in the given range (NO in S74), the captured image determination section 130 determines that the XOR image is not a blown-out highlights image (S76), and proceeds to the process of S77.

Next, the captured image determination section 130 prepares, by the method as described in (3-4), a binarized image C from the captured image to be determined, in which a pixel having a luminance value of not more than 10 is defined as black (pixel value 0), and a pixel having a luminance value of more than 10 is defined as white (pixel value 1) (S77).

Similarly, the captured image determination section 130 prepares a binarized image D in which, in the captured image to be detected, a pixel having a luminance value of not more than 30 is defined as black (pixel value 0), and a pixel having a luminance value of more than 30 is defined as white (pixel value 1) (S78).

Thereafter, the captured image determination section 130 prepares a binary image (XOR image) obtained by obtaining the XOR of the binarized image C and the binarized image D (S79).

The captured image determination section 130 determines whether or not (i) the XOR image includes a pixel having the pixel value "1" and (ii) a coordinate of the pixel having the pixel value "1" is included within the given range surrounding the region having the pixel value "0" in the binarized image C (S80). If the pixel having the pixel value "1" is included within the given range (YES in S80), the captured image determination section 130 determines the XOR image as an image that has lost shadow detail (S81), and returns to the process of S3 in FIG. 3. On the other hand, if no pixel having the pixel value "1" is included within the given range (NO in S80), the captured image determination section 130 determines the XOR image as not an image that has lost shadow detail (S82), and returns to the process of S3 in FIG. 3.

The captured image determination section 130 determines whether the captured image includes no blown-out highlights or loss of shadow detail, that is, whether or not the image is acceptable (S3). If the captured image determination section 130 determines that the image is not acceptable (NO in S3), the control section 110 causes the display section 170 to display a message or the like to urge carrying out of image capture again, in order to notify the user of the situation (S5). Thereafter, the image capture section 120 carries out image capture under a plurality of different exposure conditions, one or more pieces of image capture being carried out per exposure condition (S6). Then, the image capture section 120 prepares the tag information (S7), and thereafter proceeds to S8.

On the other hand, if the captured image determination section 130 determines that the image is acceptable (YES in S3), the control section 110 carries out image capture to obtain a plurality of pieces of images without changing the exposure condition (S4), and thereafter proceeds to S8. Note that the number of pieces to be captured is the number of pieces of captured images that is set in the control section 110. Moreover, the number of times image capture is carried out with a changed exposure condition (exposure condition to be modified) may also be set in the control section 110. Alternatively, the user may arbitrarily set the number of times the image capture is to be carried out.

Thereafter, the control section 110 assigns file names to the plurality of pieces of captured image data obtained by the image capture (S8). The file names assigned by the control section 110 are, as described above, file names that associate the plurality of pieces of the captured image data with each other.

Thereafter, the control section 110 transfers the plurality of pieces of the captured image data to the communication section 150, together with the tag information, and the information of the model of the portable terminal apparatus 100, user information, and output processing information, each of which are stored in the storage section 160. The communication section 150 then sends these information to the image output apparatus 500 (S9).

Note that the control section 110 may first cause the storage section 160 or a memory card to temporally store the image data assigned with a file name, then cause to transfer, in accordance with a user request, the image data together with the tag information, the information of the model of the portable terminal apparatus 100, the user information, and the output processing information, to the communication section 150, and thereafter send these information to the image output apparatus 500.

Next, the first communication section 590 of the image output apparatus 500 receives the plurality of pieces of the captured image data, the model information, the user information, and the output processing information, from the portable terminal apparatus 100 (S21). After these information have been received, the image quality adjustment section 531 of the image processing section 530 carries out correction of color balance, contrast, and luminance, for example as described in the foregoing (6-1) (S22). Thereafter, the geometric correction section 532 of the image processing section 530 carries out correction of geometric distortion and lens distortion, for example as described in the foregoing (6-2) (S23).

In S24, the image correction section 535 selects, among the plurality of pieces of captured image data to which various corrections have been carried out in S22 and S23, captured image data including no blown-out highlights or loss of shadow detail, or alternatively, captured image data with few blown-out highlights or loss of shadow detail (captured image data under the exposure condition having few blown-out highlights or loss of shadow detail). In detail, the image correction section 535 carries out determination of blown-out highlights or loss of shadow detail described in (3-4), similarly to the captured image determination section 130, and selects a captured image determined as having no blown-out highlights or loss of shadow detail, as optimum captured image data.

Further, in S25, the high resolution processing section 534 carries out high resolution correction with respect to the captured image data selected in S24. How the high resolution correction is specifically carried out is as described in the foregoing (6-3) or (6-4).

Thereafter, the control section 510 causes the storage section 570 to store the captured image data that is selected by the image correction section 535 (S26).

Subsequently, the control section 510 determines whether or not an output instruction of the captured image data is entered in the input section 580 (S27). If no output instruction is entered (NO in S27), the control section 510 waits until an output instruction is entered.

On the other hand, if the output instruction is entered (YES in S27), the certifying section 540 causes the display section 560 to display a screen that urges the user to enter the user information (e.g., user ID and password), and acquires the user information through the input section 580. Then, the certifying section 540 carries out user certification (S28). The certifying section 540 may acquire the user information from a non-contact IC card held by the user, by use of a non-contact IC card reader/writer provided to the image output apparatus 500.

Upon certifying the user information, the certifying section 540 compares the entered user information with the user information received from the portable terminal apparatus 100, so as to determine whether or not user information that match each other exists (S29). In a case where the user information received from the portable terminal apparatus 100 matches the user information entered by the user (YES in S29), the control section 510 causes an output process to be carried out in accordance with the output processing information received from the portable terminal apparatus 100 (S32). For example, in a case where the output processing information indicates a printing process, the control section 510 causes output of a process execution instruction to the image forming section 550. Thereafter, the process is terminated.

On the other hand, if the entered user information does not match the user information received from the portable terminal apparatus 100 (NO in S29), the certifying section 540 determines whether the number of times certification is carried out meets a given number of times (S30). If the number of times the certification is carried out does not reach the given number of times (NO in S30), the processes of S28 and S29 are repeatedly carried out. If the number of times certification is carried out is not less than the given number of times (YES in S30), no output is made and the process is terminated.

(Advantages of Captured Image Processing System)

As described above, according to the present embodiment, the portable terminal apparatus 100 in the captured image processing system carries out image capture under a plurality of different exposure conditions, in which one or more pieces of images are captured per exposure condition. The image output apparatus 500 in the captured image processing system selects, among the captured images obtained under the plurality of exposure conditions, an optimum captured image in which few blown-out highlights or loss of shadow detail is included. Further, the image output apparatus 500 can output the selected optimum captured image in a state in which high resolution processing has been carried out to the captured image. Hence, the captured image processing system can output an image that includes no loss of shadow detail or blown-out highlights, thereby allowing improvement in readability of text in the outputted image.

(8) Modification

The captured image processing system of the present invention is not limited to the foregoing embodiment, and various modifications may be made thereto. The following description explains one example of such a modification.

(8-1) Flow of Processes Carried Out in Portable Terminal Apparatus 100

In the foregoing embodiment, the portable terminal apparatus 100 automatically carries out image capture under a plurality of different exposure conditions, in a case where the captured image determination section 130 of the portable terminal apparatus 100 determines that the captured image is not acceptable. However, the portable terminal apparatus 100 may urge the user to carry out the image capture again in the case where the captured image determination section 130 determines that the captured image is not acceptable.

Figure 11:
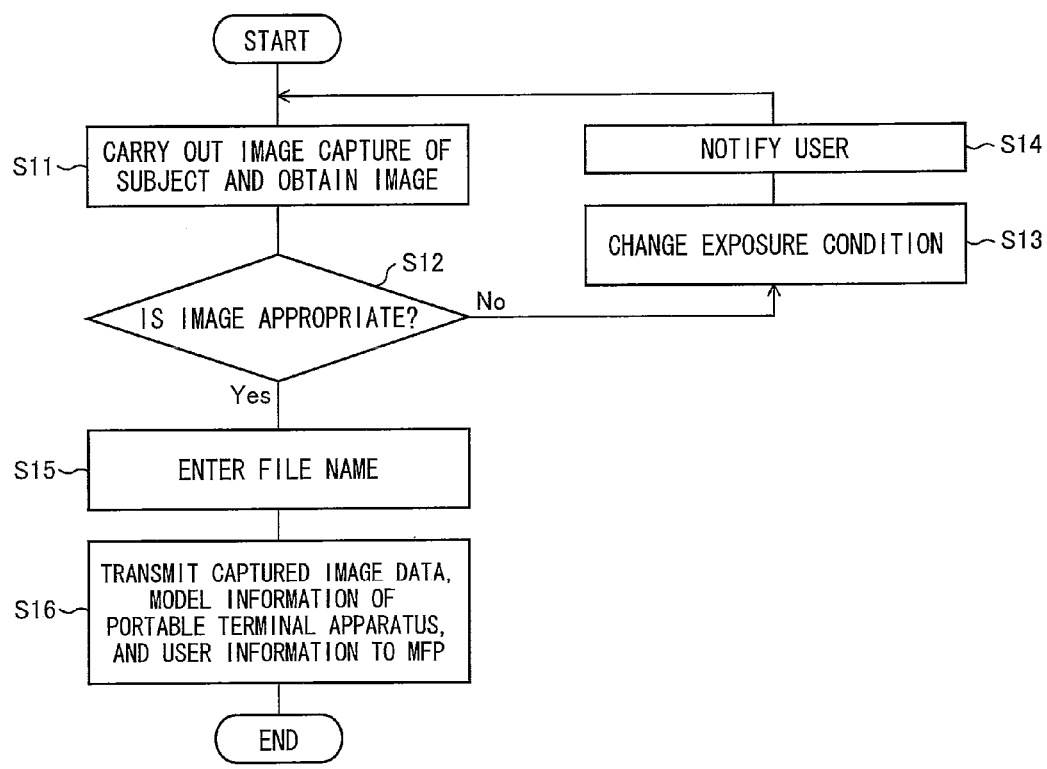
FIG. 11 is a flow chart illustrating another example of a captured image processing of a portable terminal apparatus of the present invention.

The flow of processes in the portable terminal apparatus 100 in this case is described with reference to FIG. 11.

Similarly to the foregoing embodiment, the portable terminal apparatus 100 accepts (i) selection of the image capture mode, (ii) input of the magnification of resolution conversion, (iii) type of output process, and (iv) input of setting conditions for the output processing.

Thereafter, similarly to the foregoing embodiment, the image capture section 120 commences taking in a viewer image indicative of the image capture object (S11), and upon detection of a shutter click, the captured image determination section 130 determines whether or not the captured image (or the viewer image) is an acceptable image including no blown-out highlights or loss of shadow detail (S12).

In a case where the captured image determination section 130 is determined as not acceptable (NO in S12), the image capture section 120 changes the exposure condition (S13), and the control section 110 causes the display section 170 to display a message urging for the image capture to be carried out again, in order to notify the user of the situation (S14).

The following description explains in detail of what is displayed on the display section 170, in notifying the user.

In a case where the captured image determination section 130 provides a determination result that an angle θ of a skew is not within a given range, the control section 110 causes the display section 170 to display a message urging the user to carry out image capture again in such a manner that the image capture object is not skewed.

Moreover, in a case where it is determined that features indicative of a degree of geometric distortion (in this modification, a ratio of a length of opposite sides of the image capture object in the captured image) is not within the given range, the control section 110 causes the display section 170 to display a message urging the user to carry out image capture of the rectangular plane surface of the image capture object on which plane surface the text is written, from a normal direction of the plane surface.

Furthermore, in a case where it is determined that a given number of captured images offset by a given amount is not included, the control section 110 causes the display section 170 to display a message for example "This image may possibly not be processed. Please carry out image capture once more", to urge image capture again, so that a new image is obtained. Thereafter, the captured image determination section 130 carries out the determination process again with respect to a plurality of pieces of captured images newly obtained by carrying out the image capture again, and once the captured image is determined that all of the process execution conditions are met, the newly obtained plurality of pieces of captured images are used in the latter processes. Alternatively, the captured image determination section 130 carries out the determination process again with respect to a combination of a previously captured image and a newly captured image, and a captured image which meets all of the process executing conditions is used in the latter processes.

Moreover, in the case where it is determined that the image includes overexposed parts or underexposed parts, the display section 170 may be caused to display this result.

Moreover, in the case where the captured image determination section 130 determines that the captured image includes the blown-out highlights, the control section 110 notifies the image capture section 120 of the blown-out highlights, and the image capture section 120 automatically changes the settings to a plurality of different exposure conditions (aperture, gain etc.) and carries out image capture of the image capture object to obtain a plurality of pieces of images.

After the process of notifying the user is carried out in S14, the process returns to S11.

On the other hand, if the captured image determination section 130 determines that the image is acceptable (YES in S12), the process proceeds to S15.

Thereafter, the control section 110 assigns file names to the plurality of pieces of captured image data that are captured upon detection of the shutter click (S15). The file names are assigned in such a manner that, just numbered parts differ from each other, and other parts are given a common name, for example, like "ABC_1.jpg", "ABC_2.jpg" and so on.

Finally, the control section 110 prepares the tag information, and causes one or more pieces of image data be transferred to the communication section 150, together with the tag information, and information of a model of the portable terminal apparatus 100, user information, and the output processing information, each of which are stored in the storage section 160. Further, the communication section 150 sends these information to the image output apparatus 500 (S16).

(8-2) Optimum Image Stored in Storage Section 570 by Image Processing Section 530 of Image Output Apparatus The foregoing embodiment described a case where the image correction section 535 of the image processing section 530 selects, from a plurality of captured images received from the portable terminal apparatus 100, an optimum image including few blown-out highlights or loss of shadow detail, and the high resolution processing section 534 of the image processing section 530 carries out high resolution correction to the selected image and causes the storage section 570 to store this image which has been subjected to the high resolution correction. The present modification prepares an image that includes few regions in which blown-out highlights or loss of shadow detail is included, by substituting pixels in a region in the captured image including the blown-out highlights or loss of shadow detail, which region has the blown-out highlights or loss of shadow detail, with pixels of other captured images corresponding to that pixel. In this case, a normal captured image is determined in advance, such as a captured image obtained by carrying out image capture of the image capture object under a first exposure condition prior to making a change in the exposure condition. Thereafter, an image for use in substitution of the pixels is selected among captured images obtained by carrying out image capture under exposure conditions different from the first exposure condition. The image thus selected as the image used for the substitution has a difference within a given range between (i) luminance of a region in the vicinity of a region which includes the blown-out highlights or loss of shadow detail in the normal captured image and (ii) luminance of a region corresponding to the region in the vicinity of the region which includes the blown-out highlights or loss of shadow detail in the normal captured image.

In the case where a plurality of regions that require substitution is included in the normal captured image, the image correction section 535 calculates an average value of RGB signals in block units or an average value of luminance value, with respect to all of the plurality of pieces of captured images received from the portable terminal apparatus 100. Thereafter, the image correction section 535 selects, per region in which substitution is carried out, another captured image having an average value in a block corresponding to the block of the region in the normal captured image closest to the average value in the block of the region in the normal captured image, as the captured image for use in the substitution.

Then, the image quality adjustment section 531 of the image processing section 530 carries out correction of color balance and contrast, luminance correction, tone correction, and shading correction, with respect to the image obtained after substitution of the region which includes the blown-out highlights or loss of shadow detail in the image indicated by the normal captured image data. Finally, the image correction section 535 stores this image which has been subjected to these corrections, in the storage section 570 as an optimum image.

Note that the image yet to be subjected to correction of color balance or the like and the image which has been subjected to correction can be displayed on the display section 560, to cause the user to select an image and have the storage section 570 store the selected image as the optimum image.

(8-3) Other Method for Preparing Optimum Image

The description in (8-2) explains that in the captured image processing system, in order to output an optimum image in which no blown-out highlights or loss of shadow detail is included, (i) the portable terminal apparatus 100 carries out image capture a plurality of times under different exposure conditions, (ii) a normal captured image is selected among the plurality of captured images received by the image output apparatus 500 from the portable terminal apparatus 100, and (iii) a region in the selected captured image which region includes the blown-out highlights or loss of shadow detail is substituted with an image of a region in another captured image which region corresponds to the region in the selected image including the blown-out highlights or loss of shadow detail, so as to prepare an optimum image. However, the method for preparing the optimum image is not limited to this method.

Namely, an optimum image without any blown-out highlight or loss of shadow detail can be prepared by (i) having the portable terminal apparatus 100 carry out image capture a plurality of times under a single exposure condition in which no blown-out highlight occurs, then (ii) having the image processing section 530 of the image output apparatus 500 prepare an image in which the plurality of captured images received from the portable terminal apparatus 100 are superimposed. In the embodiment, the image in which the plurality of captured images are superimposed denotes an image in which a luminance value of pixels of coordinates (X,Y) in the image are each a total sum of luminance values of respective pixels in each of the coordinates (X,Y) in N pieces of captured images, where the number of pieces of captured images being superimposed is N pieces.

In a case where a plurality of captured images are superimposed to prepare an optimum image, the number of captured images to superimpose is adjusted depending on luminance (luminance value) of the captured images. That is to say, for example, an average value of luminance of each of the pixels in the captured image is calculated, and in a case where the average value of the luminance is small, then the images to be superimposed is increased in number, and if the average value of the luminance is great, then the images to be superimposed is reduced in number.

Note that, in the case where the captured images are superimposed, merely adding up the luminance value causes the luminance value to exceed the maximum value of 255. Thus, it is necessary to keep the luminance value below 255. That is to say, in a case where a pixel that has a large luminance value is included in the captured images to be superimposed, a value multiplying a weighting coefficient of less than 1 to the total sum value of the luminance values serves as the luminance value of the pixel corresponding to the image to be prepared. Similarly, in a case where a pixel having a small luminance value is included in the captured images to be superimposed, a value multiplying a weighting coefficient of not less than 1 to a total sum value of the luminance values serves as the luminance value of the pixel corresponding in the image to be prepared. By preparing the image in such a manner that weighting is added to the luminance value of pixels in the image captured in a same condition, it is possible to prevent generation of random noise in the image to be prepared. Note that the number of images to be superimposed and the weighting coefficient are determined in advance in accordance with the luminance, by use of various image samples.

Moreover, the number of captured images that are superimposed may be made different per block (e.g., 64×64, 128× 128). Namely, an average value of luminance is calculated per block, and in a case where the average value of the luminance is small within the block, the images to be superimposed is increased in number in that block, and in a case where the average value of the luminance is great, the images to be superimposed is reduced in number for that block. Alternatively, a region separation process can be carried out to the captured image to separate the image into a text region and a background (bedding) region, and the captured image can be superimposed just in the bedding region. Note that, as a method for the region separation process, a method disclosed in Japanese Patent Application Publication, Tokukai, No. 2002-232708 A may be used. This method is described below.

That is to say, first, a minimum density value and a maximum density value in a block of n×m (e.g., 7×15) including a target pixel are calculated in the captured image. Next, the calculated minimum density value and maximum density value are used to calculate a maximum density difference. Thereafter, a total sum density complex degree is calculated, which total sum density complex degree is a total sum of an absolute value of density differences of pixels adjacent to each other (e.g., a sum of values calculated with respect to a main scanning direction and a sub-scanning direction).

Subsequently, the calculated maximum density difference is compared with a maximum density difference threshold, and the calculated total sum density complex degree is compared with a total sum density complex degree threshold. If the maximum density difference is smaller than the maximum density difference threshold and the total sum density complex degree is smaller than the total sum density complex degree threshold, the target pixel is determined as belonging to a bedding/photographic paper photograph region (photograph region, continuous tone region), and in a case where the maximum density difference is equal to or greater than the maximum density difference threshold or the total sum density complex degree is equal to or greater than the total sum density complex degree threshold, the target pixel is determined as belonging to a letter/dot region.

Furthermore, with the pixels that are determined as belonging to the bedding/photographic paper photograph region, in a case where the target pixel has a maximum density difference smaller than a bedding/photographic paper photograph determination threshold, the pixel is determined as a bedding pixel, and if the maximum density difference is equal to or greater than the bedding/photographic paper photograph determination threshold, the pixel is determined as a photographic paper photograph pixel. On the other hand, with the pixels that are determined as belonging to the letter/dot region, if the target pixel has a total sum density complex degree smaller than the value of maximum density difference multiplied to the letter/dot determination threshold, the target pixel is determined as a letter pixel, and if the above is not satisfied, the target pixel is determined as a dot pixel.

The above description explains a method of the region separation process disclosed in Japanese Patent Application Publication, Tokukai, No. 2002-232708 A, however the method of the region separation process applicable to the present invention is not limited to this method.

Moreover, it is possible to prepare a better image by adjusting the number of images to be superimposed or the weighting coefficient upon finding a luminance distribution by use of the image sample in advance, and not using the number of images to be superimposed or the weighting coefficient as they are. That is to say, a luminance distribution is calculated per block unit with respect to the captured images to be superimposed, and the intensity of luminance is stored per block. Thereafter, the number of images to be superimposed and the weighting coefficient are adjusted, so that the intensity of luminance per block in the image to be prepared meets the intensity of luminance per block in the captured images to be superimposed. Moreover, even in a case where the image of the object is included in the captured image in such a manner that the image of the object stretches over a plurality of blocks adjacent to each other, it is preferable that adjustment of luminance value at boundary parts of the blocks is carried out so that the boundary parts of the blocks in the prepared image do not look unnatural.

When adding the luminance values, it is possible to prepare a smooth natural image by taking into consideration not just the integral parts of the luminance value calculated by use of expression (4) but also decimal parts of the calculated luminance value.

(Program and Recording Medium)

The present invention can be achieved by recording, on a computer-readable recording medium in which a program to be executed by a computer is recorded, a method in which the image captured by the portable terminal apparatus 100 is transmitted to and outputted by an image forming apparatus.

This makes it possible to portably provide a recording medium in which program codes (an executable program, an intermediate code program, and a source program) for carrying out the above process are recorded.

Note, in the present embodiment, that the recording medium can be a memory (not illustrated) such as a ROM or the recording medium itself can be a program medium (not illustrated) because the process is carried out by a microcomputer. Alternatively, the recording medium can be a program medium from which the program codes can be read out by carrying out loading of a recording medium with respect to a program reading device provided as an external storage apparatus (not illustrated).

In any case, an arrangement can be employed in which a stored program is executed by access of a microprocessor. Alternatively, in any case, a system can be employed in which the program codes are read out and downloaded on a program storage area (not illustrated) of the microcomputer, and then the program is executed. The program for the downloading is stored in a main body in advance. Note here that the program medium is a recording medium which is arranged to be detachable from the main body. The program media can also be a medium fixedly bearing a program code which medium includes (i) a tape such as a magnetic tape or a cassette tape, (ii) a disk including a magnetic disk such as a flexible disk or a hard disk and an optical disk such as a CD-ROM, an MO, an MD, or a DVD, (iii) a card, such as an IC card (including a memory card) or an optical card, or (iv) a semiconductor memory of a mask ROM, EPROM (Erasable Programmable Read Only Memory), EEPROM (Electrically Erasable Programmable Read Only Memory), or a flash ROM.

Further, the present embodiment has a system architecture which is connectable to a communication network including the Internet. As such, the recording medium can be a medium which bears the program codes in a flexible manner so that the program code is downloaded from the communication network. Note that, in a case where the program is downloaded from the communication network as described above, the program for the downloading can be stored beforehand in the main body or can be installed from an alternative recording medium. Note that the present invention can also be realized in a form of a computer data signal in which the program code is embodied by an electronic transmission and which is embedded in carrier waves.

The recording medium is read by a program scanning device included in the portable terminal apparatus or a digital color image forming apparatus, whereby the image processing method is carried out.

A portable terminal apparatus of the present invention can be arranged in such a manner that the image capture section is capable of taking in, in advance, an image indicative of the image capture object, prior to carrying out the image capture, and the captured image determination section determines whether or not the image data indicative of the image taken in prior to carrying out the image capture by the image capture section meets the given condition, instead of determining whether or not said captured image data obtained by carrying out the image capture with the image capture section meets the given condition.

The portable terminal apparatus preferably further includes: a display control section for controlling display on the display section; and an instruction accepting control section for accepting an instruction from a user through the input section, in a case where the captured image determination section determines that the given condition is met, the display control section displaying a message on the display section to inform such a situation, and the instruction accepting control section simultaneously receiving an instruction to carry out image capture again, the captured image determination section determining whether or not captured image data obtained by carrying out image capture under a different exposure condition from that of at a time when said captured image data determined as meeting the given condition was captured meets the given condition, the image capture carried out under the different exposure condition being carried out by the image capture section in accordance with the instruction to carry out the image capture again, and the transmission section transmitting, to the image output apparatus, captured image data determined by the captured image determination section as not meeting the given condition.

The arrangement further attains an effect that the portable terminal apparatus is capable of outputting captured image data without having the image output apparatus carry out a process of selecting captured image data that includes no blown-out highlights or loss of shadow detail.

The portable terminal apparatus preferably further includes: a recording control section for recording, to a storage section, the plurality of pieces of captured image data obtained by the image capture section consecutively carrying out image capture under the plurality of different exposure conditions, the plurality of pieces of captured image data being recorded in such a manner that the plurality of pieces of captured image data are associated with each other, the transmission section transmitting, to the image output apparatus, the plurality of pieces of captured image data recorded associated to each other in the storage section.

According to the arrangement, the image output apparatus receives the plurality of pieces of captured image data obtained by consecutively carrying out image capture of the image capture object in a state in which the plurality of pieces of captured image data are associated with each other. Hence, the portable terminal apparatus allows easily specifying the plurality of captured image data that are candidates for selection of captured image data to be outputted to the image output apparatus, for example in a case where the image output apparatus carries out a selection process of captured image data to be outputted among the plurality of pieces of captured image data.

In order to attain the object, an image output apparatus of the present invention includes: a communication section for receiving captured image data from the portable terminal apparatus; an image processing section for selecting, in a case where the captured image data received by the communication section includes a plurality of pieces of captured image data that are captured under respective different exposure conditions, any one of captured image data not meeting the given condition among the plurality of pieces of captured image data; and an output section for outputting the captured image data selected by the image processing section.

According to the arrangement, the image output apparatus carries out an output process to output any one of captured image data that does not meet a given condition. Therefore, the image output apparatus allows the user to easily obtain captured image data that includes no blown-out highlights or loss of shadow detail.

Moreover, in order to attain the object, an image output method of the present invention is a method of outputting an image from an image output apparatus including (i) a communication section for receiving captured image data from the portable terminal apparatus, (ii) an image processing section for carrying out image processing to the captured image data, and (iii) an output section for outputting the captured image data, the method including the steps of: in a case where the captured image data received by the communication section includes a plurality of pieces of captured image data captured under respective different exposure conditions, the image processing section selecting any one of pieces of captured image data not meeting the given condition, among the plurality of pieces of the captured image data; and the output section outputting the captured image data selected by the image processing section.

With the arrangement, it is possible to attain a similar effect as the image output apparatus.

The image output apparatus preferably further includes: a correction processing section for carrying out high resolution correction to prepare high resolution image data having a resolution higher than the captured image data selected by the image processing section, the output section outputting the high resolution image data prepared by the correction processing section.

According to the arrangement, the image output apparatus can output captured image data which has a higher resolution than the captured image data obtained by carrying out image capture with the portable terminal apparatus and which includes no blown-out highlights or loss of shadow detail.

Moreover, a captured image processing system of the present invention includes: the portable terminal apparatus; and the image output apparatus for receiving from the portable terminal apparatus a plurality of pieces of image data.

According to the arrangement, the user can easily obtain, from the image output apparatus, captured image data including no blown-out highlights or loss of shadow detail, among a plurality of pieces of captured image data obtained by carrying out image capture under a plurality of different exposure conditions by the portable terminal apparatus.

The portable terminal apparatus and the image output apparatus may be realized by a computer. In this case, a program that causes a computer to function as the portable terminal apparatus by causing the computer to operate as each of sections of the portable terminal apparatus, a program that causes a computer to function as the image output apparatus by causing the computer to operate as each of sections of the image output apparatus, and a computer-readable recording medium in which either or both of the programs are recorded are also within the scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a captured image processing system for carrying out data communication between a portable terminal apparatus and an image output apparatus.

| Reference Signs List | |
|---|---|
| 100 | portable terminal apparatus |
| 110 | control section (display control section, instruction accepting control section, recording control section) |
| 120 | image capture section |
| 130 | captured image determination section |
| 140 | image processing section |
| 150 | communication section (transmission section) |
| 160 | storage section |
| 170 | display section |
| 180 | input section |
| 190 | recording medium accessing section |
| 500 | image output apparatus |
| 510 | control section |
| 520 | image scanning section |
| 530 | image processing section |
| 531 | image quality adjustment section |
| 532 | geometric correction section |
| 533 | lens distortion correction section |
| 534 | high resolution processing section (correction processing section) |
| 535 | image correction section |
| 540 | certifying section |
| 550 | image forming section |
| 560 | display section |
| 570 | storage section |
| 580 | input section |
| 590 | first communication section (communication section) |
| 600 | second communication section (output section) |
| 610 | recording medium accessing section |

What is claimed is:

1. A portable terminal apparatus including a transmission section for transmitting a plurality of pieces of image data to an image output apparatus that outputs image data,
said portable terminal apparatus comprising:
an image capture section capable of consecutively carrying out image capture a plurality of times with respect to a same image capture object; and
a captured image determination section for determining whether or not captured image data meets a given condition, said captured image data being obtained by carrying out the image capture by the image capture section,
the given condition including at least the following condition A:
condition A: (a) whether an exclusive OR is true for (i) a first binarized image in which a captured image indicated by said captured image data is binarized in accordance with whether each pixel in the captured image is a white pixel having, as features indicative of a degree of luminance of said each pixel, features not less than a first threshold and (ii) a second binarized image in which the captured image is binarized in accordance with whether said each pixel is a white pixel having, as the features indicative of the degree of the luminance of said each pixel, features not less than a second threshold, the second threshold being smaller than the first threshold, or alternatively, (b) whether an exclusive OR is true for (i) a third binarized image in which the captured image is binarized in accordance with whether said each pixel is a black pixel having, as the features indicative of the degree of the luminance of said each pixel, features not more than a third threshold and (ii) a fourth binarized image in which the captured image is binarized in accordance with whether said each pixel is a black pixel having, as the features indicative of the degree of the luminance of said each pixel, features not more than a fourth threshold, the fourth threshold being greater than the third threshold,
in a case where the captured image determination section determines that said captured image data meets the given condition, the image capture section consecutively carrying out image capture with respect to the image capture object under a plurality of different exposure conditions from an exposure condition set for carrying out the image capture for obtaining said captured image data, and
the transmission section transmitting, to the image output apparatus, captured image data obtained by carrying out the image capture with respect to the image capture object under the plurality of different exposure conditions.

2. The portable terminal apparatus according to claim 1, wherein: the image capture section is capable of taking in, in advance, an image indicative of the image capture object, prior to carrying out the image capture, and
the captured image determination section determines whether or not the image data indicative of the image taken in prior to carrying out the image capture by the image capture section meets the given condition, instead of determining whether or not said captured image data obtained by carrying out the image capture with the image capture section meets the given condition.

3. The portable terminal apparatus according to claim 1, further comprising:
a display control section for controlling display on a display section; and
an instruction accepting control section for accepting an instruction from a user through an input section,
in a case where the captured image determination section determines that the given condition is met, the display control section displaying a message on the display section to inform such a situation, and the instruction accepting control section simultaneously receiving an instruction to carry out image capture again,
the captured image determination section determining whether or not captured image data obtained by carrying out image capture under a different exposure condition from that of at a time when said captured image data determined as meeting the given condition was captured meets the given condition, the image capture carried out under the different exposure condition being carried out by the image capture section in accordance with the instruction to carry out the image capture again, and
the transmission section transmitting, to the image output apparatus, captured image data determined by the captured image determination section as not meeting the given condition.

4. The portable terminal apparatus according to claim 1, further comprising:
a recording control section for recording, to a storage section, the plurality of pieces of captured image data obtained by the image capture section consecutively carrying out image capture under the plurality of different exposure conditions, the plurality of pieces of captured image data being recorded in such a manner that the plurality of pieces of captured image data are associated with each other, the transmission section transmitting, to the image output apparatus, the plurality of pieces of captured image data recorded associated to each other in the storage section.

5. An image output apparatus comprising:

a communication section for receiving captured image data from a portable terminal apparatus recited in claim 1;

an image processing section for selecting, in a case where the captured image data received by the communication section includes a plurality of pieces of captured image data that are captured under respective different exposure conditions, any one of captured image data not meeting the given condition among the plurality of pieces of captured image data; and an output section for outputting the captured image data selected by the image processing section.

6. The image output apparatus according to claim 5, further comprising:

a correction processing section for carrying out high resolution correction to prepare high resolution image data having a resolution higher than the captured image data selected by the image processing section, the output section outputting the high resolution image data prepared by the correction processing section.

7. A non-transitory computer-readable recording medium in which a program for causing a computer to operate as a portable terminal apparatus as set forth in claim 1 is recorded, the program causing the computer to function as each section of the portable terminal apparatus.

8. A non-transitory computer-readable recording medium in which a program for causing a computer to operate as an image output apparatus as set forth in claim 5 is recorded, the program causing the computer to function as each section of the image output apparatus.

9. A method of controlling a portable terminal apparatus including (i) a transmission section for transmitting a plurality of pieces of image data to an image output apparatus that outputs image data and (ii) an image capture section capable of consecutively carrying out image capture a plurality of times with respect to a same image capture object, said method comprising the steps of:

a captured image determination section determining whether or not captured image data obtained by carrying out image capture by the image capture section meets a given condition;

in a case where the captured image determination section determines that said captured image data meets the given condition, the image capture section consecutively carrying out image capture of the image capture object under a plurality of exposure conditions different from an exposure condition set for carrying out the image capture for obtaining said captured image data; and the transmission section transmitting, to the image output apparatus, captured image data obtained by carrying out the image capture with respect to the image capture object under the plurality of different exposure conditions, the given condition including at least the following condition A:

condition A: (a) whether an exclusive OR is true for (i) a first binarized image in which a captured image indicated by said captured image data is binarized in accordance with whether each pixel in the captured image is a white pixel having, as features indicative of a degree of luminance of said each pixel, features not less than a first threshold and (ii) a second binarized image in which the captured image is binarized in accordance with weather said each pixel is a white pixel having, as the features indicative of the degree of the luminance of said each pixel, features not less than a second threshold, the second threshold being smaller than the first threshold, or alternatively, (b) whether an exclusive OR is true for (i) a third binarized image in which the captured image is binarized in accordance with whether said each pixel is a black pixel having, as the features indicative of the degree of the luminance of said each pixel, features not more than a third threshold and (ii) a fourth binarized image in which the captured image is binarized in accordance with weather said each pixel is a black pixel having, as the features indicative of the degree of the luminance of said each pixel, features, not more than a fourth threshold, the fourth threshold being greater than the third threshold.

* * * * *